(12) United States Patent
Khanh et al.

(10) Patent No.: US 12,386,495 B2
(45) Date of Patent: Aug. 12, 2025

(54) ELECTRONIC DEVICE AND METHOD FOR EDITING SCREENSHOT IN ELECTRONIC DEVICE

(71) Applicant: Samsung Electronics Co., Ltd., Suwon-si (KR)

(72) Inventors: Nguyen Van Khanh, Bac Ninh Province (VN); Do Thi Phuong Thao, Bac Ninh Province (VN); Ha Thanh Luan, Bac Ninh Province (VN); Bui Thi Le Quyen, Bac Ninh Province (VN); Nguyen Tien Dat, Bac Ninh Province (VN)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 18/518,800

(22) Filed: Nov. 24, 2023

(65) Prior Publication Data

US 2024/0176474 A1 May 30, 2024

(30) Foreign Application Priority Data

Nov. 25, 2022 (KR) .......................... 10-2022-0159907

(51) Int. Cl.
G06F 3/04845 (2022.01)
G06F 16/583 (2019.01)

(52) U.S. Cl.
CPC ........ *G06F 3/04845* (2013.01); *G06F 16/583* (2019.01)

(58) Field of Classification Search
CPC .......................... G06F 3/04845; G06F 16/583
See application file for complete search history.

(56) References Cited

U.S. PATENT DOCUMENTS 8,799,756 B2   8/2014   Grosz et al.
9,286,706 B1   3/2016   Krishnaswamy et al.
(Continued)

FOREIGN PATENT DOCUMENTS

| EP | 2840488 A1 | 2/2015 |
| JP | 2009-187081 A | 8/2009 |
| KR | 10-2017-0050972 A | 5/2017 |

*Primary Examiner* — Lisa S Landis
(74) *Attorney, Agent, or Firm* — Jefferson IP Law, LLP

(57) ABSTRACT

An electronic device is provided. The electronic device includes memory, a display, and a processor. The memory stores at least one instruction configured to cause, when executed by the processor, the electronic device to, according to an embodiment, when a first input for capturing screenshot for information displayed on the display is identified, obtain data related to an application providing the information, as metadata of the captured screenshot. The memory stores at least one instruction configured to cause, when executed by the processor, the electronic device to, according to an embodiment, when a second input for editing the captured screenshot is identified, identify whether an edit template associated with metadata of the captured screenshot exists in the memory. The memory stores at least one instruction configured to cause, when executed by the processor, the electronic device to, according to an embodiment, when an edit template associated with metadata of the captured screenshot exists in the memory, edit the captured screenshot based on the edit template and control the display to display the edited screenshot.

18 Claims, 18 Drawing Sheets

(56) References Cited

U.S. PATENT DOCUMENTS

| | | |
|---|---|---|
| 9,569,697 B1 | 2/2017 | McNerney et al. |
| 10,824,594 B2 | 11/2020 | Guest |
| 2013/0332857 A1 | 12/2013 | Kim et al. |
| 2014/0241592 A1 | 8/2014 | Yang |
| 2019/0147026 A1* | 5/2019 | Jon .................... G06F 3/04883 715/230 |
| 2019/0258498 A1 | 8/2019 | Chandan et al. |
| 2021/0089334 A1 | 3/2021 | Thota et al. |

* cited by examiner

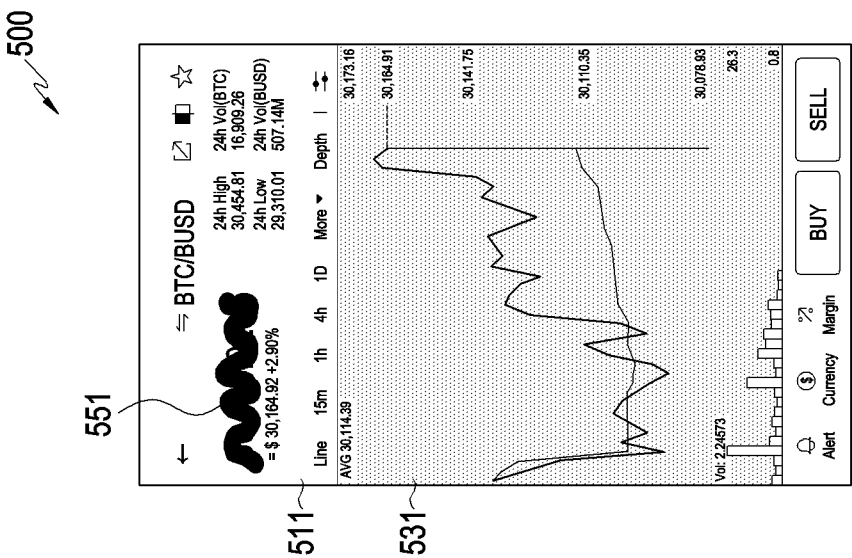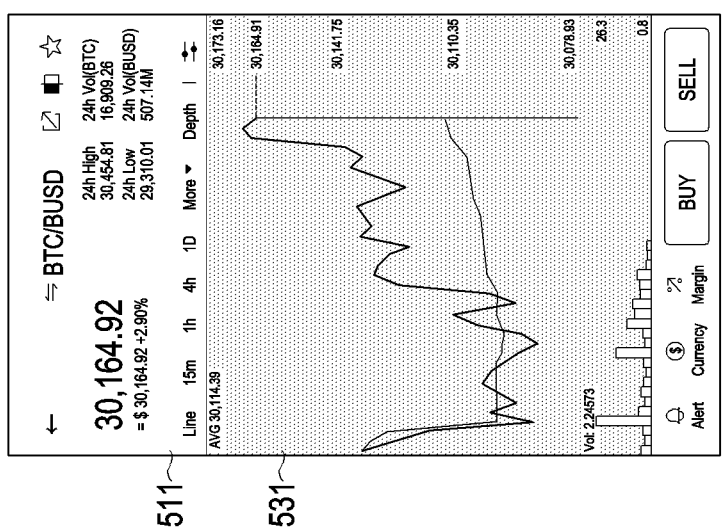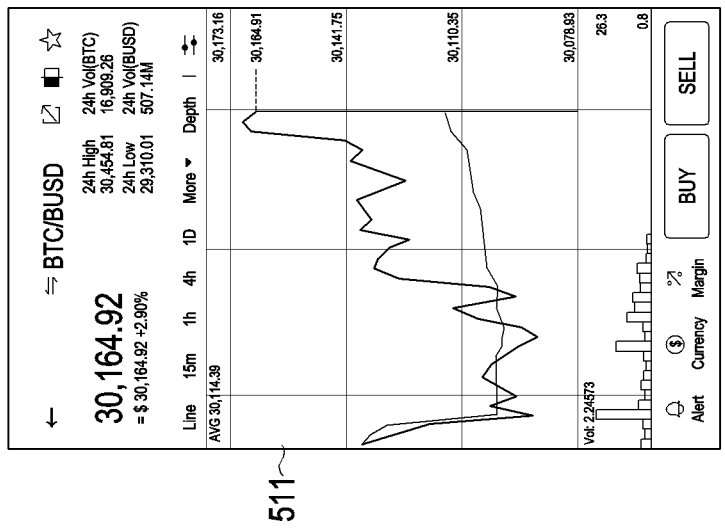
FIG. 5

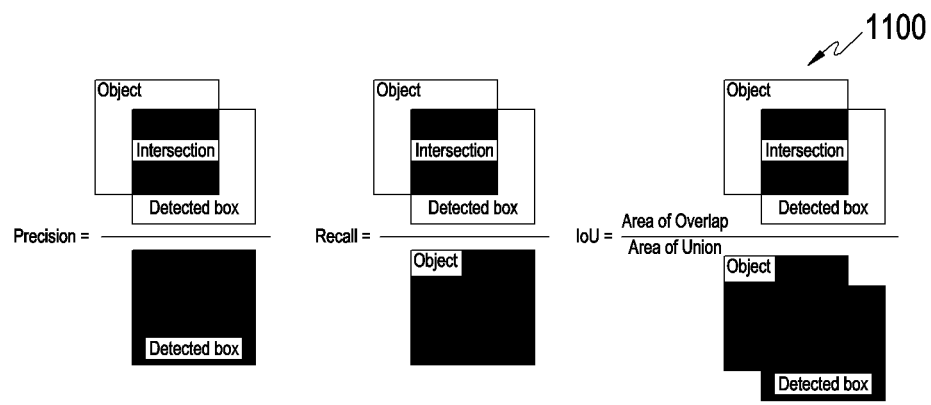
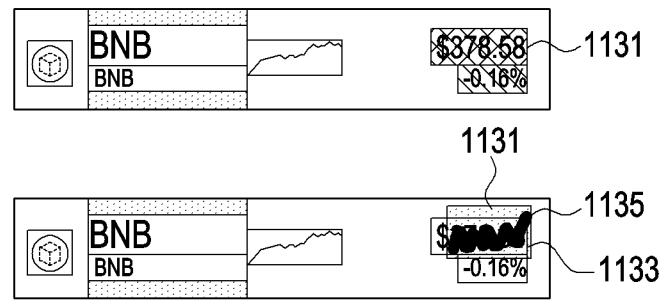
FIG. 11

ELECTRONIC DEVICE AND METHOD FOR EDITING SCREENSHOT IN ELECTRONIC DEVICE

CROSS-REFERENCE TO RELATED APPLICATION(S)

This application is based on and claims priority under 35 U.S.C. § 119(a) of a Korean patent application number 10-2022-0159907, filed on Nov. 25, 2022, in the Korean Intellectual Property Office, the disclosure of which is incorporated by reference herein in its entirety.

BACKGROUND

1. Field

The disclosure relates to an electronic device and a method for editing a screenshot in the electronic device.

2. Description of Related Art

In case that a user wants to share an information page or a user interface (UI) of application displayed on an electronic device, the user may capture a screenshot of the page or application displayed on the electronic device.

In addition, a user may edit the screenshot by using various editing effects, for example, cropping and/or blurring on the electronic device.

The procedure may usually be repeated over and over again with the same application, page, and/or activity, and objects being edited are also usually the same.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide an electronic device and a method for editing a screenshot in the electronic device.

Additional aspects will be set forth in part in the description which follows and, in part, will be apparent from the description, or may be learned by practice of the presented embodiments.

In accordance with an aspect of the disclosure, an electronic device is provided. The electronic device includes memory, a display, and a processor.

The memory may store at least one instruction configured to cause, when executed by the processor, the electronic device to, according to an embodiment, when a first input for capturing a screenshot for information displayed on the display is identified, obtain data related to an application providing the information, as metadata of the captured screenshot.

The memory may store at least one instruction configured to cause, when executed by the processor, the electronic device to, according to an embodiment, when a second input for editing the captured screenshot is identified, identify whether an edit template associated with metadata of the captured screenshot exists in the memory.

The memory may store at least one instruction configured to cause, when executed by the processor, the electronic device to, according to an embodiment, when an edit template associated with metadata of the captured screenshot exists in the memory, edit the captured screenshot based on the edit template and control the display to display the edited screenshot.

In accordance with another aspect of the disclosure, a method for editing a screenshot in an electronic device is provided. The method includes, when a first input for capturing a screenshot for information displayed on the display of the electronic device is identified, obtaining data related to an application providing the information, as metadata of the captured screenshot.

The method according to an embodiment may include, when a second input for editing the captured screenshot is identified, identifying whether an edit template associated with metadata of the captured screenshot exists in the memory.

The method according to an embodiment may include, when an edit template associated with metadata of the captured screenshot exists in the memory, editing the captured screenshot based on the edit template.

The method according to an embodiment may include controlling the display to display the edited screenshot.

A non-transitory computer readable medium storing at least one instruction, wherein the at least one instruction, when executed by a processor of an electronic device, may cause the electronic device to, according to an embodiment, when a first input for capturing a screenshot for information displayed on the display is identified, obtain data related to an application providing the information, as metadata of the captured screenshot.

The non-transitory computer readable medium storing at least one instruction, wherein the at least one instruction, when executed by the processor of the electronic device, may cause the electronic device to, according to an embodiment, when a second input for editing the captured screenshot is identified, identify whether an edit template associated with the metadata of the captured screenshot exists in the memory.

The non-transitory computer readable medium storing at least one instruction, wherein the at least one instruction, when executed by the processor of the electronic device, may cause the electronic device to, according to an embodiment, when the edit template associated with the metadata of the captured screenshot exists in the memory, edit the captured screenshot based on the edit template.

The non-transitory computer readable medium storing at least one instruction, wherein the at least one instruction, when executed by the processor of the electronic device, may cause the electronic device to, according to an embodiment, control the display to display the edited screenshot.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 5 illustrates an operation of editing a screenshot based on an edit template in an electronic device according to an embodiment of the disclosure;

FIG. 11 illustrates an operation of detecting an object to edit a screenshot based on an edit template in an electronic device according to an embodiment of the disclosure;

Throughout the drawings, it should be noted that like reference numbers are used to depict the same or similar elements, features, and structures.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
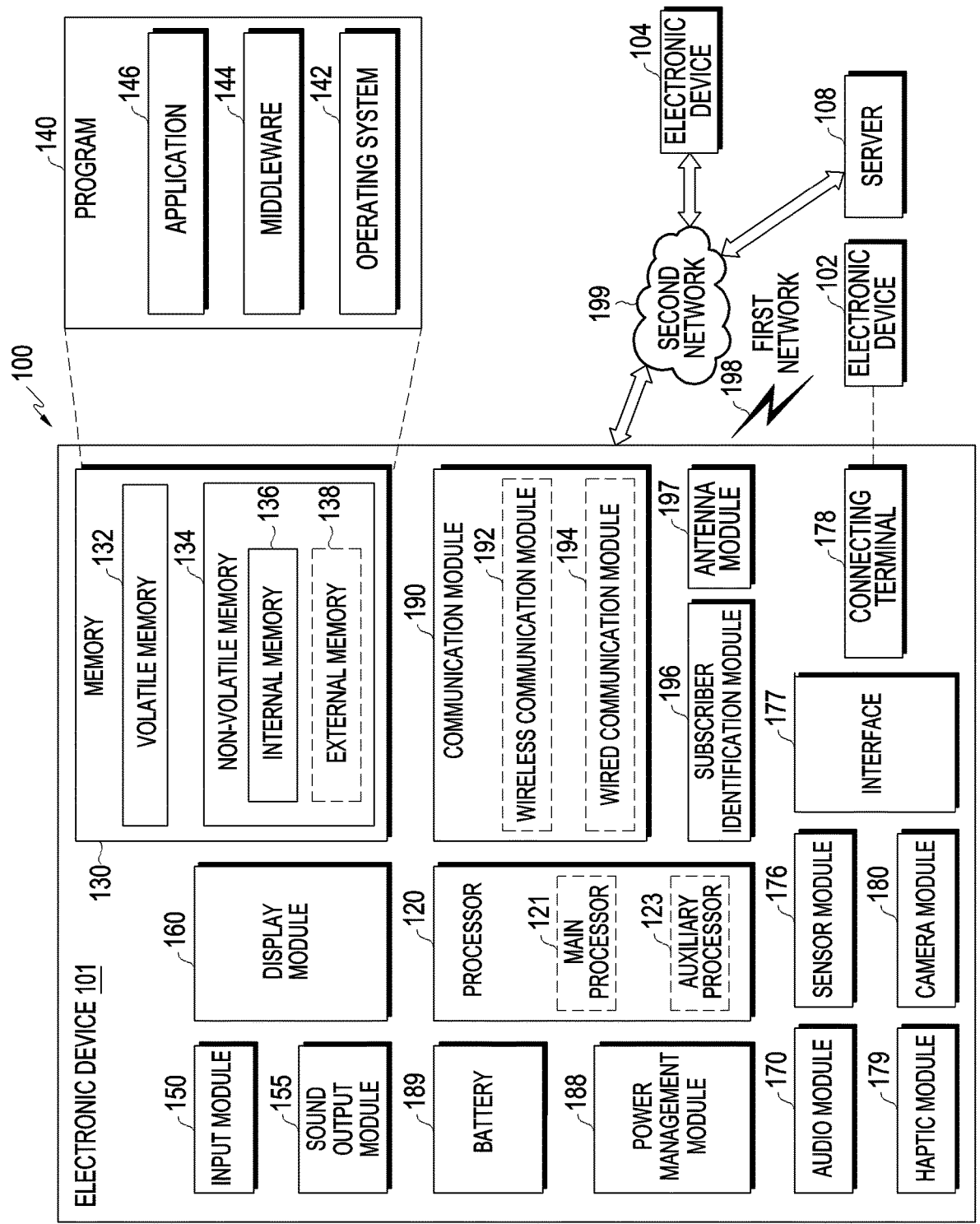
FIG. 1 is a block diagram of an electronic device in a network environment according to an embodiment of the disclosure.

FIG. 1 is a block diagram illustrating an electronic device 101 in a network environment 100 according to an embodiment of the disclosure.

Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted Boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device 104 via the first network 198 (e.g., a short-range communication network, such as Bluetooth™, Wi-Fi direct, or infrared data association (IrDA)) or the second network 199 (e.g., a long-range communication network, such as a legacy cellular network, a 5th generation (5G) network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4th generation (4G) network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the millimeter-wave (mm Wave) band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to embodiments, the antenna module 197 may form a mm Wave antenna module. According to an embodiment, the mm Wave antenna module may include a printed circuit board, a RFIC disposed on a first surface (e.g., the bottom surface) of the printed circuit board, or adjacent to the first surface and capable of supporting a designated high-frequency band (e.g., the mm Wave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IOT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

Figure 2:
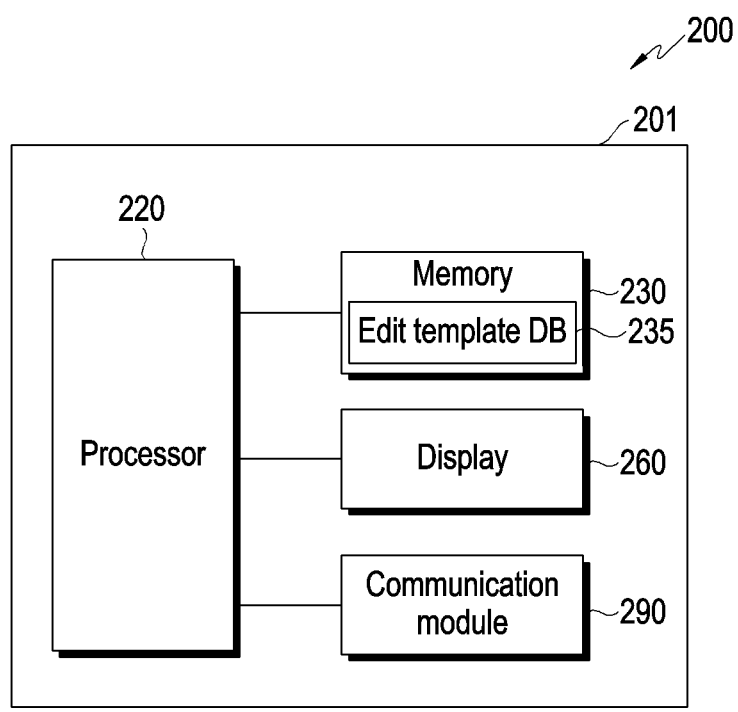
FIG. 2 is a block diagram of an electronic device according to an embodiment of the disclosure.

FIG. 2 is a block diagram 200 of an electronic device according to an embodiment of the disclosure.

Referring to FIG. 2, according to an embodiment, an electronic device 201 may include a processor 220, a memory 230, a display 260, and a communication module 290.

At least some of the elements of the electronic device 201 shown of FIG. 2 may be the same as or similar to those of the electronic device 101 of FIG. 1, and duplicate descriptions will be omitted below.

According to an embodiment, the processor 220 may be implemented substantially the same as or similar to the processor 120 of FIG. 1.

According to an embodiment, in a case of detecting an input for capturing a screenshot for information displayed on the display 260, the processor 220 may collect data related to an application providing the information, as metadata of the captured screenshot.

According to an embodiment, in case that the processor 220 identifies execution of a function of the screenshot capture while displaying information provided by the currently running application through the display 260, the processor 220 may collect data related to the application, as metadata of the captured screenshot. A screenshot obtained by executing of a function of the screenshot capture described below may indicate a captured screenshot.

For example, the processor 220 may identify, as execution of the screenshot capture function, an operation of inputting a PrtSc key of a keyboard in a Windows environment, an operation of simultaneously inputting a power key and a down key in an Android environment, an operation of simultaneously inputting a home key and a power key in an IOS environment, and/or an operation of swiping the screen by hand on the smartphone.

According to an embodiment, the processor 220 may, based on the support of a platform level or application programming interface (API) provided by an application, detect at least one of an identifier (ID) of the application, a name of the application, a package name capable of identifying the application, an activity identifier of the application, a page identifier of a web application, or a uniform resource locator (URL) of a web browser as data related to the application, and collect data related to the application as metadata of the captured screenshot.

According to an embodiment, in case that a screenshot of a plurality of merged images is captured, the processor 220 may merge data related to a plurality of applications corresponding to the plurality of images to generate application-related data, and collect the generated application-related data as metadata of the captured screenshot.

According to an embodiment, the processor 220 may store the metadata of the screenshot by including the same in an image file (e.g., RAW format, joint photographic experts group (JPEG) format, and/or tag image file format (TIFF) format) of the captured screenshot, or separately store the same in the memory 230.

According to an embodiment, the processor 220 may store the metadata of the captured screenshot in an exchangeable image file format (EXIF) format or an extensible metadata platform (XMP) format.

According to an embodiment, the processor 220 may additionally store a capture condition of the captured screenshot, for example, a scale ratio and/or a resolution as meta data of the captured screenshot.

According to an embodiment, the processor 220 may, after collecting the application-related data as metadata of the captured screenshot, identify an editing operation for the captured screenshot, and in case that it is identified that an edit template associated with the metadata of the captured screenshot exists in the memory 230, the processor may edit the captured screenshot based on the edit template, and display the edited screenshot by controlling the display 260.

According to an embodiment, when selection of an editing function after capturing the screenshot is identified, the processor 220 may identify the existence of a list of edit templates associated with the metadata of the captured screenshot in an edit template DB 235 of the memory 230. When the existence of a list of edit templates associated with the metadata of the captured screenshot is identified, the processor 220 may sort edit templates included in the edit template list based on a time stamp indicating a generation time of the edit template. For example, in case that a name of the application is stored as metadata of the captured screenshot, the processor 220 may identify whether a list of edit templates stored with the name of the application exists in the edit template DB 235.

According to an embodiment, the processor 220 may, in a case of identifying an edit template, in which an edited screenshot matching the captured screenshot exists, in the edit template list, identify the type of effect group included in the edit template.

According to an embodiment, in case that the edited screenshot matching the captured screenshot does not exist, the processor 220 may adjust the scale of the captured screenshot to be the same as the scale ratio of each of the at least one edited screenshot existing in the template list, and then identify an edit template in which an edited screenshot matching the captured screenshot exists.

According to an embodiment, in case that the type of effect group included in the edit template is identified as a first effect group, the processor 220 may detect at least one object from the captured screenshot, and edit the captured screenshot by applying the effect properties of the first effect group to the at least one object.

According to an embodiment, the processor may apply effect properties of the first effect group to at least one object in the captured screenshot, and the effect properties of the first effect group may include, for example, information shown in Table 1 below.

TABLE 1

| Group | Effect type | Object properties | | Effect properties |
|---|---|---|---|---|
| 1 | Cropping | Object ID | Object coordinates (x, y, w, h) | Image size, ratio |
| 1 | Drawing | Account number | Object coordinates (x, y, w, h) | Drawing pattern, size, color |
| 1 | Mosaic | Account balance | Object coordinates (x, y, w, h) | Mosaic pattern, size, color |
| 1 | Blurring | Account balance | Object coordinates (x, y, w, h) | Blurring size and color |

According to an embodiment, the processor 220 may detect at least one object from the captured screenshot by comparing the edited screenshot with the captured screenshot. The processor 220 may compare the edited screenshot with the captured screenshot by using several methods, such as pixels by pixels, scale invariant feature transform (SIFT), random sample consensus (RANSAC), and other computer vision algorithms, so as to detect at least one object from the captured screenshot.

According to an embodiment, the processor 220 may detect, in the captured screenshot, at least one object matched by an object property, for example, an ID of the object.

According to an embodiment, in case that the processor 220 fails to detect an object from the captured screenshot based on a result of the comparison between the edited screenshot and the captured screenshot, the processor 220 may detect the location of an object existing in the captured screenshot through an object recognition function based on object property information of the first effect group.

According to an embodiment, in case that the processor 220 fails to detect an object from the captured screenshot based on a result of the comparison between the edited screenshot and the captured screenshot, and detects a plurality of objects existing in the captured screenshot through an object recognition function based on object property information of the first effect group, the processor may receive a confirmation from a user whether to equally apply effect properties of the first effect group to all of the plurality of objects or to select an object to which the effect properties of the first effect group are applied among the plurality of objects.

According to an embodiment, in case that the type of effect group included in the edit template is identified as a second effect group, the processor 220 may apply the effect properties of the second effect group to the entire captured screenshot so as to edit the captured screenshot.

According to an embodiment, the processor may apply effect properties of the second effect group to the entire captured screenshot, and effect properties of the second effect group may include, for example, information shown in Table 2 below.

TABLE 2

| Group | Effect type | Effect properties |
|---|---|---|
| 2 | filter | Sunrise |
| 2 | Color adjustment | Brightness 60% |
| 2 | Object drawing | Text/shape/icon, color, font |

According to an embodiment, in a case of identifying both the first effect group and the second effect group as the types of effect groups included in the edit template, the processor 220 may apply the effect properties of the first effect group to at least one object in the captured screenshot, and apply the effect properties of the second effect group to the entire captured screenshot.

According to an embodiment, the processor 220 may store the edit template DB 235, having been stored in the memory 130, in a cloud server to share the same.

According to an embodiment, when the processor 220 fails to identify the existence of an edit template associated with the metadata of the captured screenshot, the processor may track a user's editing operation for the captured screenshot, and when the end of the editing operation of the captured screenshot is identified, the processor may store a new edit template corresponding to the screenshot edited by the user in the edit template DB 235 of the memory. The processor 220 may add, in the new edit template, the metadata of the captured screenshot, the edited screenshot edited by the user, a timestamp representing times when the edited screenshot and the captured screenshot have been generated, and the type of effect group (e.g., a first effect group or a first effect group) generated based on the editing operation.

According to an embodiment, when it is identified that there is no existence of an edit template associated with the metadata of the captured screenshot, the processor 220 may identify the existence of an edit template associated with the metadata of the captured screenshot in a list of edit templates associated with metadata of a different type from the metadata of the captured screenshot, and use the same. For example, when the metadata of the captured screenshot is an identifier (ID) of an application, the processor 220 may identify and use an edit template associated with a URL of a web browser that is a similar source as the application identifier. In case that the captured screenshot and the edited screenshot included in the edit template associated with the URL do not match identically due to different layouts of desktop versions, mobile versions, different resolutions, etc., the processor 220 may detect the location of an object in the captured screenshot based on metadata provided by a browser application including a hypertext markup language (HTML) layout of a website provided by a web browser.

According to an embodiment, while the screenshot having been edited based on an edit template is displayed by controlling the display 260, in case that a user's additional editing operation is identified, the processor 220 may track the user's additional editing operation for the captured screenshot, and when the end of the editing operation of the captured screenshot is identified, the processor may update the edit template based on the captured screenshot additionally edited by the user, or store the same as a new edit template in the edit template DB 235 of the memory 230.

According to an embodiment, while the captured screenshot having been edited based on an edit template is displayed by controlling the display 260, in case that a user's dissent against use of the edited screenshot is identified, the processor 220 may restore the edited screenshot to the captured screenshot before editing and display the same. The processor 220 may track the user's editing operation for the captured screenshot, and when the end of the editing operation for the captured screenshot is identified, the processor 220 may store a new editing template corresponding to the screenshot edited by the user in the edit template DB 235 of the memory 230.

Although the disclosure describes an editing operation of a captured screenshot, the editing operation may be applied identically to an operation of editing a view of a captured metaverse by using an edit template stored for the view of the metaverse, and an operation of editing a frame of screen recording by using an edit template stored for the screen recording.

In the disclosure, an operation of editing a downloaded image by using an edit template stored for a screenshot may be applied identically. For example, in a case of a downloaded image, an edit template may be identified in a list of edit templates associated with a URL of a web browser.

According to an embodiment, the memory 230 may be implemented substantially the same as or similar to the memory 130 of FIG. 1.

According to an embodiment, an edit template DB 235 is stored in the memory 230. The edit template DB 235 stores metadata and at least one edit template associated with the metadata, and an edited screenshot and a type of effect group (e.g., a first effect group and/or a second effect group) may be stored in the edit template.

According to an embodiment, the display 260 may be implemented substantially the same as or similar to the display module 160 of FIG. 1.

According to an embodiment, an edited screenshot based on an edit template associated with metadata of the captured screenshot may be displayed on the display 260.

According to an embodiment, the communication module 290 may be implemented substantially the same as or similar to the communication module 190 of FIG. 1, and may include a plurality of communication circuits using different communication technologies.

According to an embodiment, the communication module 290 may include at least one of a wireless LAN module (not shown) and a short-distance communication module (not shown), and the short-range communication module (not shown) may include an ultra-wideband (UWB) communication module, a Wi-Fi communication module, a near-field communication (NFC) communication module, a Bluetooth legacy communication module, and/or a Bluetooth low energy (BLE) communication module.

An electronic device (101 of FIG. 1, 201 of FIG. 2) according to an embodiment may include memory (130 of FIG. 1, 230 of FIG. 2), a display (160 of FIG. 1, 260 of FIG. 2), and a processor (120 of FIG. 1, 220 of FIG. 2).

The memory (130 of FIG. 1, 230 of FIG. 2) may store at least one instruction configured to cause, when executed by the processor, the electronic device to, according to an embodiment, when a first input for capturing a screenshot for information displayed on the display is identified, obtain data related to an application providing the information, as meta of the captured screenshot.

The memory (130 of FIG. 1, 230 of FIG. 2) may store at least one instruction configured to cause, when executed by the processor, the electronic device to, according to an embodiment, when a second input for editing the captured screenshot is identified, identify whether an edit template associated with metadata of the captured screenshot exists in the memory.

The memory (130 of FIG. 1, 230 of FIG. 2) may store at least one instruction configured to cause, when executed by the processor, the electronic device to, according to an embodiment, when an edit template associated with metadata of the captured screenshot exists in the memory, edit the captured screenshot based on the edit template.

The memory (130 of FIG. 1, 230 of FIG. 2) may store at least one instruction configured to cause, when executed by the processor, the electronic device to, according to an embodiment, display the edited screenshot by controlling the display.

The memory (130 of FIG. 1, 230 of FIG. 2) may store at least one instruction configured to cause, when executed by the processor, the electronic device to, according to an embodiment, obtain, as the metadata of the captured screenshot, at least one of an identifier of the application, a name of the application, a package name capable of identifying the application, an activity identifier of the application, a page identifier of a web application, or a URL of a web browser.

The memory (130 of FIG. 1, 230 of FIG. 2) may store at least one instruction configured to cause, when executed by the processor, the electronic device to, according to an embodiment, identify a list of edit templates associated with the metadata of the captured screenshot in an edit template DB (235 of FIG. 2) of the memory.

The memory (130 of FIG. 1, 230 of FIG. 2) may store at least one instruction configured to cause, when executed by the processor, the electronic device to, according to an embodiment, identify an edit template including the edited screenshot having a scale ratio matching that of the captured screenshot in the list of edit templates.

The memory (130 of FIG. 1, 230 of FIG. 2) may store at least one instruction configured to cause, when executed by the processor, the electronic device to, according to an embodiment, identify a type of effect group included in the edit template.

The memory (130 of FIG. 1, 230 of FIG. 2) may store at least one instruction configured to cause, when executed by the processor, the electronic device to, according to an embodiment, when the type of the effect group is a first effect group, detect at least one object from the captured screenshot, and apply an effect property of the first effect group to the detected at least one object to edit the captured screenshot.

The memory (130 of FIG. 1, 230 of FIG. 2) may store at least one instruction configured to cause, when executed by the processor, the electronic device to, according to an embodiment, detect a location of an object existing in the captured screenshot based on a result of comparison between the edited screenshot and the captured screenshot.

The memory (130 of FIG. 1, 230 of FIG. 2) may store at least one instruction configured to cause, when executed by the processor, the electronic device to, according to an embodiment, when an object is not detected from the captured screenshot based on the result of comparison between the edited screenshot and the captured screenshot, detect a location of the object existing in the captured screenshot through an object recognition function.

The memory (130 of FIG. 1, 230 of FIG. 2) may store at least one instruction configured to cause, when executed by the processor, the electronic device to, according to an embodiment, when the type of the effect group is a second effect group, edit the captured screenshot by applying the effect properties of the second effect group to the captured screenshot.

The memory (130 of FIG. 1, 230 of FIG. 2) may store at least one instruction configured to cause, when executed by the processor, the electronic device to, according to an embodiment, when an edit template associated with the metadata of the captured screenshot does not exist in the memory, track a user's editing operation for the captured screenshot, and when the user's editing operation ends, store a new edit template corresponding to the edited screenshot edited by the user in the edit template database (DB) of the memory.

The memory (130 of FIG. 1, 230 of FIG. 2) may store at least one instruction configured to cause, when executed by the processor, the electronic device to, according to an embodiment, when third input for additionally editing the edited screenshot is identified during displaying the edited screenshot on the display, additionally edit the edited screenshot based on the third input.

The memory (130 of FIG. 1, 230 of FIG. 2) may store at least one instruction configured to cause, when executed by the processor, the electronic device to, according to an embodiment, when identifying that the third input ends, update the edit template based on the additionally edited screenshot.

The memory (130 of FIG. 1, 230 of FIG. 2) may store at least one instruction configured to cause, when executed by the processor, the electronic device to, according to an embodiment, when a fourth input not to store the edited screenshot in the memory is identified during displaying the edited screenshot on the display, restore the captured screenshot.

The memory (130 of FIG. 1, 230 of FIG. 2) may store at least one instruction configured to cause, when executed by the processor, the electronic device to, according to an embodiment, when a fifth input for editing the restored captured screenshot is identified, edit the restored captured screenshot based on the fifth input.

The memory (130 of FIG. 1, 230 of FIG. 2) may store at least one instruction configured to cause, when executed by the processor, the electronic device to, according to an embodiment, when identifying that the fifth input ends, store a new editing template corresponding to the restored captured screenshot in the edit template DB of the memory.

Figure 3A:
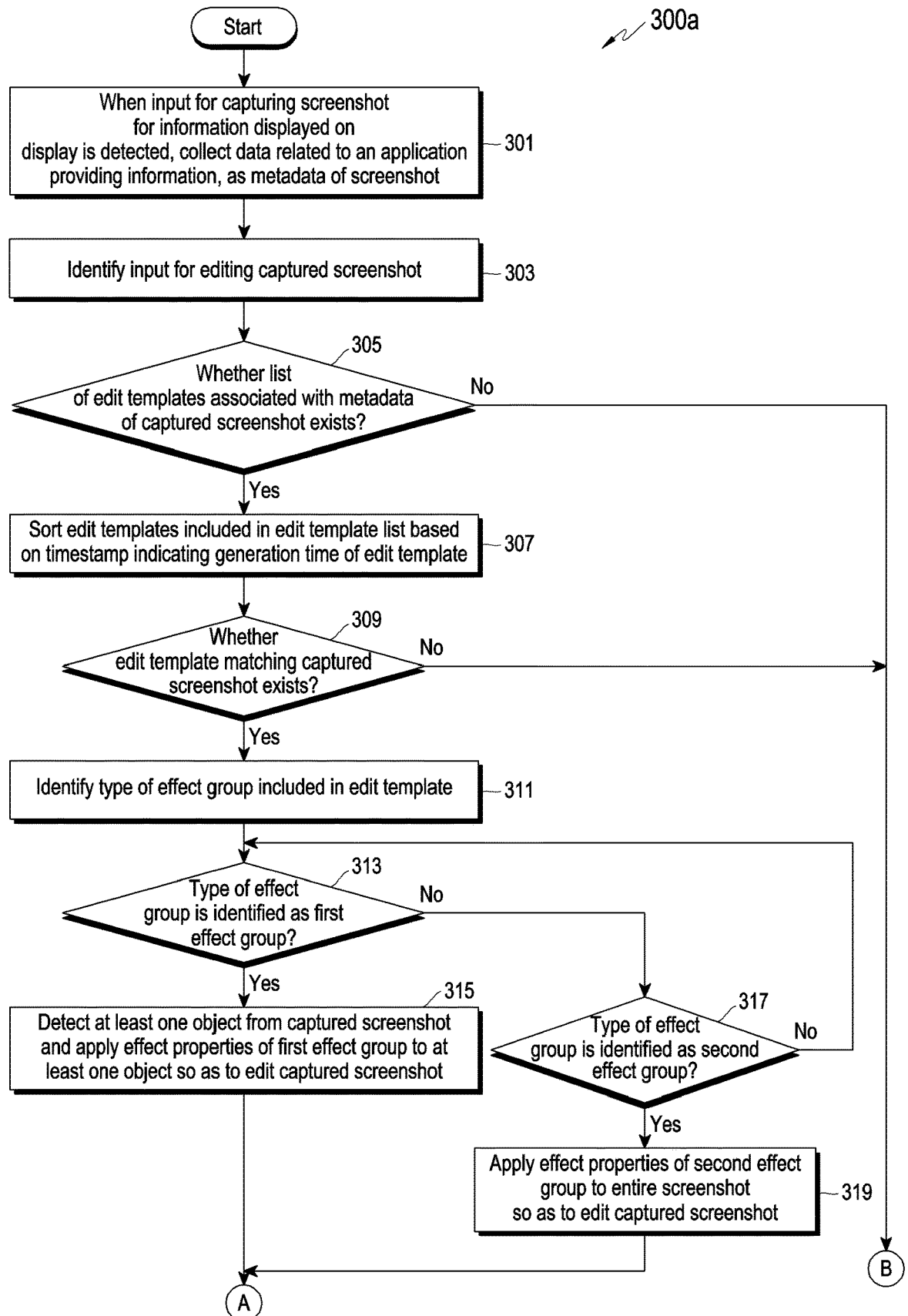
FIG. 3A is flowchart illustrating an operation of editing a screenshot in an electronic device according to an embodiment of the disclosure.
Figure 3B:
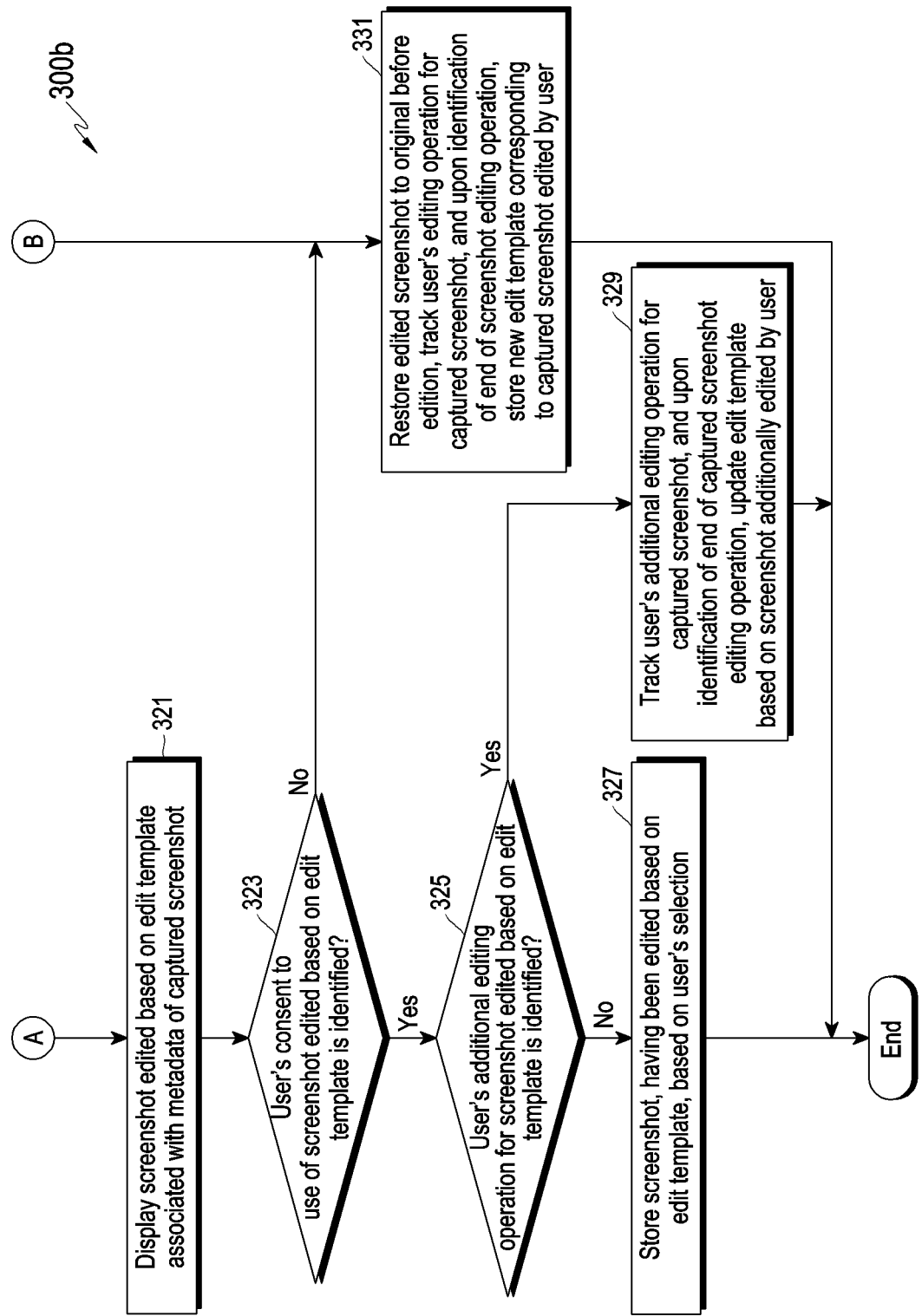
FIG. 3B is a flowchart illustrating an operation of editing a screenshot in an electronic device according to an embodiment of the disclosure.

FIG. 3A is flowchart 300a illustrating an operation of editing a screenshot in an electronic device according to an embodiment of the disclosure, and FIG. 3B is a flowchart 300b illustrating an operation of editing a screenshot in an electronic device according to an embodiment of the disclosure. Operations for editing the screenshot may include operations 301 to 331. In the following embodiments, each operation may be performed sequentially, but is not necessarily performed sequentially. For example, the order of each operation may be changed, at least two operations may be performed in parallel, or another operation may be added.

In operation 301, when a input for capturing a screenshot for information displayed on a display (e.g., the display 260 of FIG. 2) is detected, an electronic device (e.g., the electronic device 101 of FIG. 1 and/or the electronic device 201 of FIG. 2) may collect data related to an application providing the information, as metadata of the screenshot.

According to an embodiment, when the electronic device identifies execution of a function of capturing the screenshot while displaying information provided by the currently running application through the display 260, the electronic device may collect data related to the application, as metadata of the captured screenshot.

According to an embodiment, based on the support of a platform level or API provided by an application, the electronic device may detect at least one of an identifier of the application, a name of the application, a package name capable of identifying the application, an activity identifier of the application, a page identifier of a web application, or a URL of a web browser as data related to the application, and collect data related to the application as metadata of the captured screenshot.

In operation 303, the electronic device (e.g., the electronic device 101 of FIG. 1 and/or the electronic device 201 of FIG. 2) may identify an input for editing the captured screenshot.

According to an embodiment, the electronic device may identify an editing operation based on selection of an editing function after capturing the screenshot.

In operation 305, the electronic device (e.g., the electronic device 101 of FIG. 1 and/or the electronic device 201 of FIG. 2) may identify whether or not a list of edit templates associated with metadata of the captured screenshot exists.

According to an embodiment, the electronic device may identify the existence of the list of edit templates associated with the metadata of the captured screenshot from an edit template DB (e.g., the edit template DB 235 of FIG. 2) of memory (e.g., the memory 230 of FIG. 2).

When the electronic device (e.g., the electronic device 101 of FIG. 1 and/or the electronic device 201 of FIG. 2) identifies the existence of a list of edit templates associated with the metadata of the captured screenshot in operation 305, the electronic device may sort edit templates included in the edit template list based on a timestamp indicating the generation time of the edit template in operation 307.

In operation 309, the electronic device (e.g., the electronic device 101 of FIG. 1 and/or the electronic device 201 of FIG. 2) may identify whether or not an edit template matching the captured screenshot exists.

According to an embodiment, the electronic device may identify whether an edit template including an edited screenshot matching the captured screenshot exists in the edit template list.

When the electronic device (e.g., the electronic device 101 of FIG. 1 and/or the electronic device 201 of FIG. 2) identifies the edit template matching the captured screenshot in operation 309, the electronic device may identify the type of an effect group included in the edit template in operation 311.

When the electronic device (e.g., the electronic device 101 of FIG. 1 and/or the electronic device 201 of FIG. 2) identifies the type of effect group as a first effect group in operation 313, the electronic device may detect at least one object from the captured screenshot and apply effect properties of the first effect group to the at least one object so as to edit the captured screenshot in operation 315.

According to an embodiment, the electronic device may detect at least one object from the captured screenshot by comparing the edited screenshot with the captured screenshot. The processor 220 may compare the edited screenshot with the captured screenshot by using several methods, such as pixels by pixels, scale invariant feature transform (SIFT), random sample consensus (RANSAC), and other computer vision algorithms, so as to detect at least one object from the captured screenshot.

According to an embodiment, when the electronic device fails to detect an object from the captured screenshot based on a result of the comparison between the edited screenshot and the captured screenshot, the electronic device may detect the location of an object existing in the captured screenshot through an object recognition function based on object property information of the first effect group.

When the electronic device (e.g., the electronic device 101 of FIG. 1 and/or the electronic device 201 of FIG. 2) identifies the type of effect group as the second effect group in operation 317, the electronic device may apply the effect properties of the second effect group to the entire captured screenshot so as to edit the captured screenshot in operation 319.

In operation 321, the electronic device (e.g., the electronic device 101 of FIG. 1 and/or the electronic device 201 of FIG. 2) may display the edited screenshot based on an edit template associated with metadata of the captured screenshot.

When the electronic device (e.g., the electronic device 101 of FIG. 1 and/or the electronic device 201 of FIG. 2) identifies a user's consent to use of the screenshot edited based on the edit template in operation 323, and fails to identify the user's additional editing operation for the screenshot edited based on the edit template in operation 325, the electronic device may store the edited screenshot, having been edited based on the edit template, based on the user's selection in operation 327. The electronic device (e.g., the electronic device 101 of FIG. 1 and/or the electronic device 201 of FIG. 2) identify the user's consent to use of the captured screenshot edited based on an input to store the edited screenshot in the memory.

When the electronic device (e.g., the electronic device 101 of FIG. 1 and/or the electronic device 201 of FIG. 2) identifies the user's additional editing operation for additionally editing the edited screenshot based on the edit template in operation 325, the electronic device may track the user's additional editing operation for the captured screenshot and when the end of the captured screenshot editing operation is identified, update the edit template based on the screenshot additionally edited by the user in operation 329.

According to an embodiment, the electronic device may store an edit template based on the additionally edited screenshot by a user, as a new edit template, in an edit template DB (e.g., the edit template DB 235 of FIG. 2) of memory (e.g., the memory 330 of FIG. 2).

In case that the electronic device (e.g., the electronic device 101 of FIG. 1 and/or the electronic device 201 of FIG. 2) fails to identify a list of edit templates associated with the metadata of the captured screenshot in operation 305, that the electronic device fails to identify an edit template matching the captured screenshot in operation 309, or that the electronic device fails to identify a user's consent to use of the screenshot edited based on the edit template in operation 323, the electronic device may restore the edited screenshot to the original (captured screenshot) before editing, track the user's editing operation for the captured screenshot, and upon identification of the end of editing operation, store a new edit template corresponding to the captured screenshot edited by the user, in operation 331. The electronic device (e.g., the electronic device 101 of FIG. 1 and/or the electronic device 201 of FIG. 2) identify that the user's consent to use of the captured screenshot edited is not detected based on an input not to store the edited screenshot in the memory.

According to an embodiment, the electronic device may store a new edit template corresponding to the screenshot edited by the user, in an edit template DB (e.g., the edit template DB 235 of FIG. 2) of memory (e.g., the memory 130 of FIG. 2).

Figure 4:
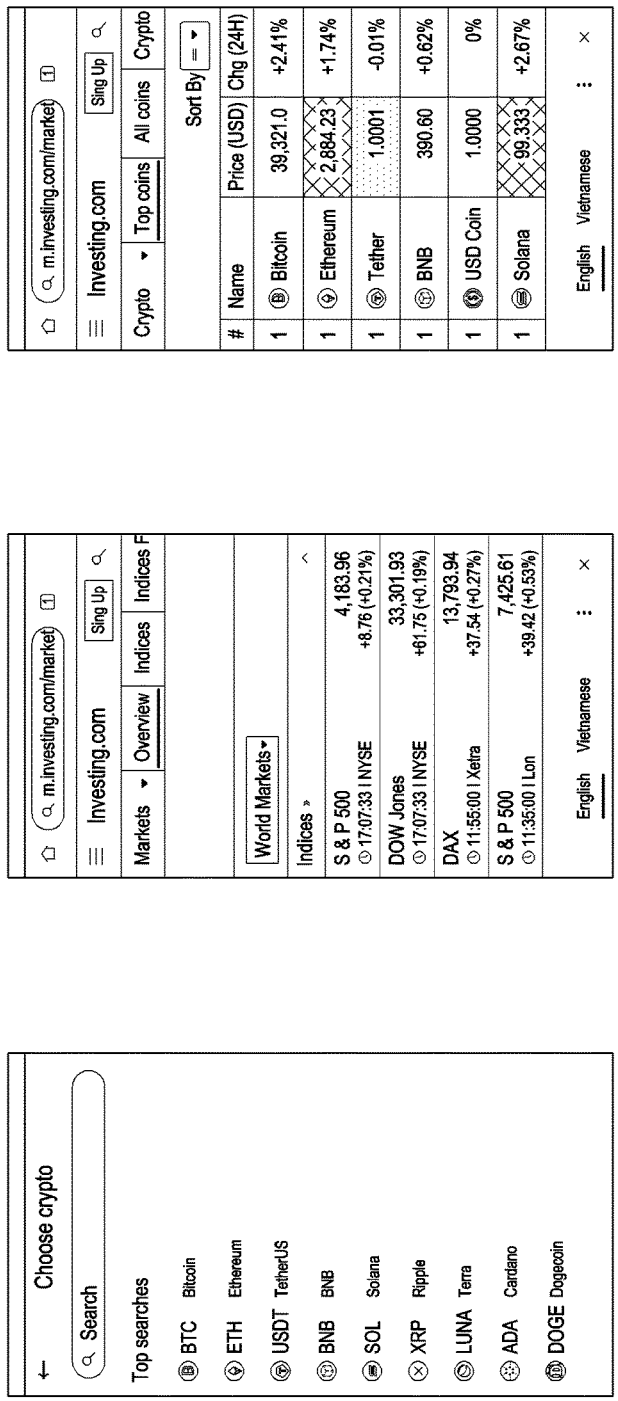
FIG. 4 illustrates metadata of a captured screenshot in an electronic device according to an embodiment of the disclosure.

FIG. 4 is a diagram 400 for explaining metadata of a captured screenshot in an electronic device according to an embodiment of the disclosure.

Referring to FIG. 4, as shown in screen <410>, an electronic device (e.g., the electronic device 101 of FIG. 1 and/or the electronic device 201 of FIG. 2) may collect at least one of a package name 411 capable of identifying an application or an activity identifier 413 of the application, as metadata of the screenshot.

As shown in the <430> screen, the electronic device (e.g., the electronic device 101 of FIG. 1 and/or the electronic device 201 of FIG. 2) may collect at least one of a package name 431 capable of identifying an application, an activity identifier 433 of the application, or a URL 435 of a web browser, as metadata of the screenshot.

As shown in the <450> screen, the electronic device (e.g., the electronic device 101 of FIG. 1 and/or the electronic device 201 of FIG. 2) may store, in a XMP format 451, at least one of the activity identifier of the application, the package name capable of identifying the application, or the URL of the web browser, which are collected as metadata of the screenshot.

FIG. 5 is a diagram 500 for explaining an operation of editing a screenshot based on an edit template in an electronic device according to an embodiment of the disclosure.

Referring to FIG. 5, as shown in screen <510>, when a screenshot 511 is captured, an electronic device (e.g., the electronic device 101 of FIG. 1 and/or the electronic device 201 of FIG. 2) may collect metadata of the captured screenshot.

As shown in screen <530>, based on an edit template associated with the metadata of the captured screenshot, the electronic device (e.g., the electronic device 101 of FIG. 1 and/or the electronic device 201 of FIG. 2) may apply a filtering effect 531 as the effect properties of a second effect group to the entire captured screenshot 511, so as to edit the captured screenshot.

As shown in screen <550>, based on an edit template associated with the captured screenshot, in addition to applying of the filtering effect 531 to the captured screenshot 511, the electronic device (e.g., the electronic device 101 of FIG. 1 and/or the electronic device 201 of FIG. 2) may detect an object based on the effect properties of a first effect group and apply a drawing effect 551 to the detected object, so as to edit the screenshot.

Figure 6:
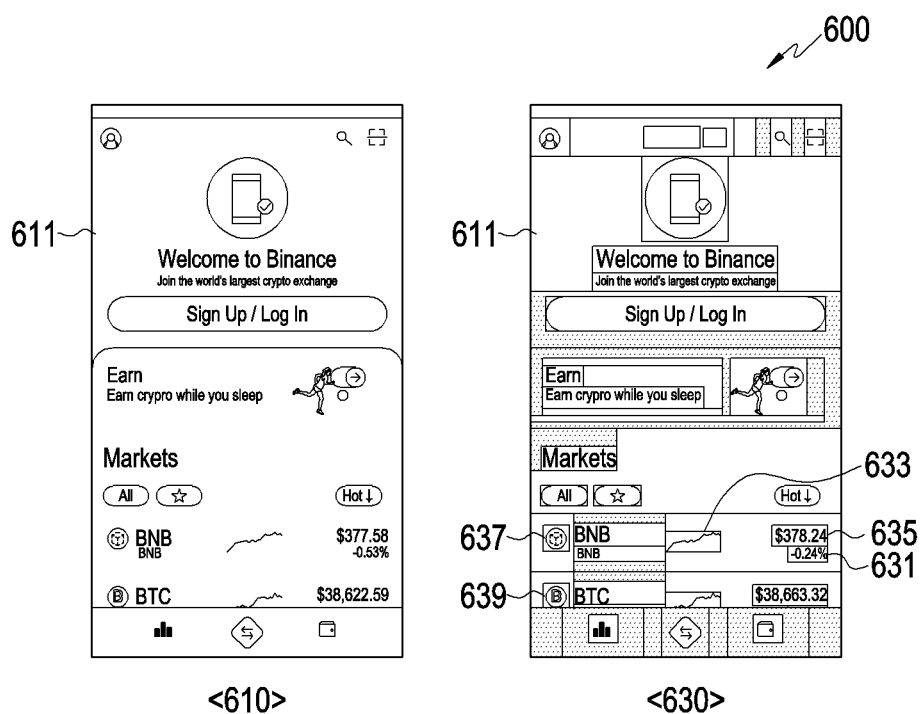
FIG. 6 illustrates an operation of detecting an object in a screenshot based on an edit template in an electronic device according to an embodiment of the disclosure.

FIG. 6 is a diagram 600 for explaining an operation of detecting an object in a screenshot based on an edit template in an electronic device according to an embodiment of the disclosure.

Referring to FIG. 6, as shown in screen <610>, when a screenshot 611 is captured, an electronic device (e.g., the electronic device 101 of FIG. 1 and/or the electronic device 201 of FIG. 2) may collect metadata of the captured screenshot.

As shown in screen <630>, in case that a first effect group is included in an edit template associated with metadata of the captured screenshot, the electronic device (e.g., the electronic device 101 of FIG. 1 and/or the electronic device 201 of FIG. 2) may compare the captured screenshot and an edited screenshot by using several methods, such as pixels by pixels, scale invariant feature transform (SIFT), random sample consensus (RANSAC), and other computer vision algorithms, and detect a plurality of objects 631, 633, 635, 637, and 639 from the screenshot 511.

Figure 7:
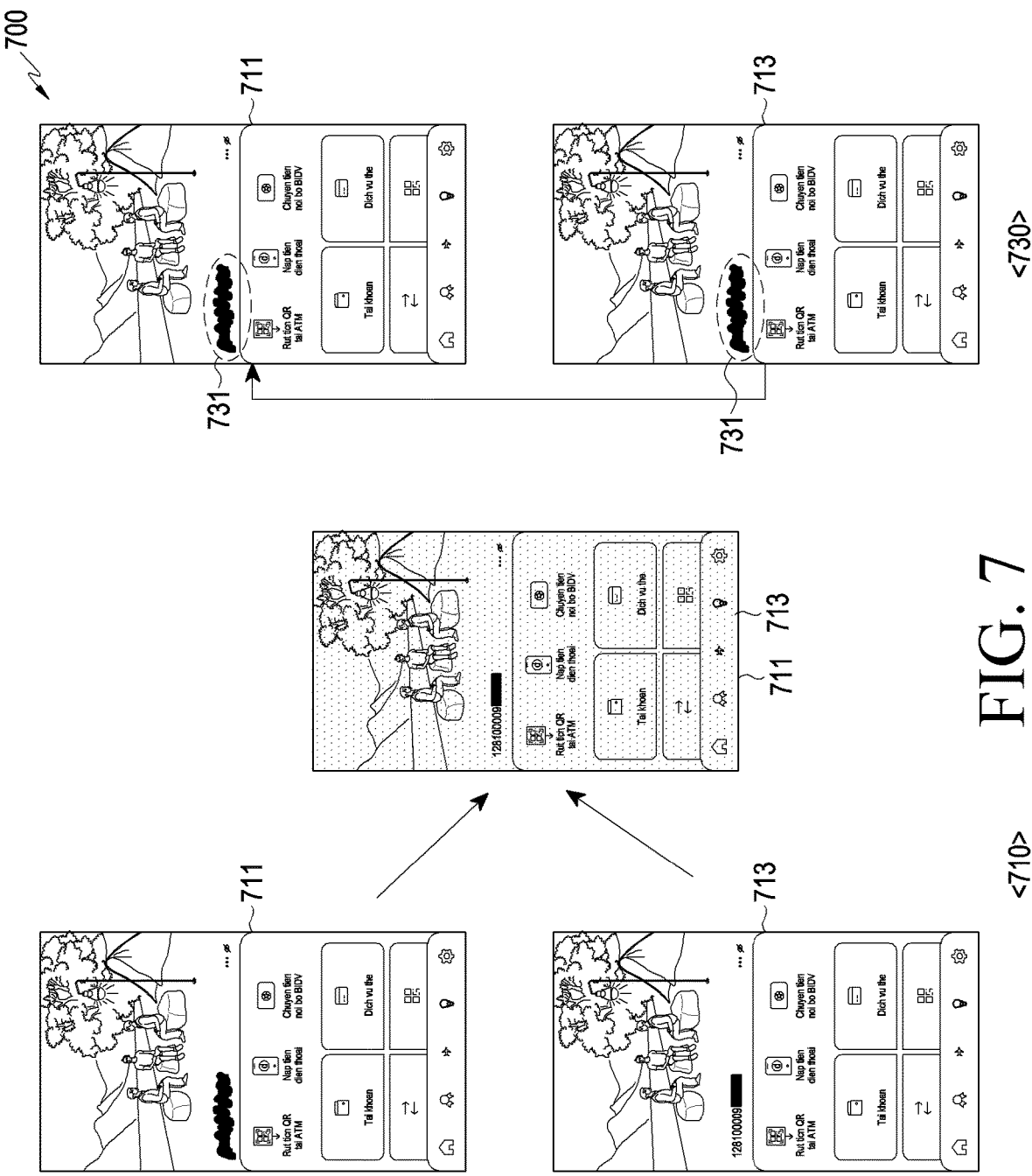
FIG. 7 illustrates an operation of editing a screenshot based on an edit template in an electronic device according to an embodiment of the disclosure.

FIG. 7 is a diagram 700 for explaining an operation of editing a screenshot based on an edit template in an electronic device according to an embodiment of the disclosure.

Referring to FIG. 7, as shown in screen <710>, when a screenshot 711 is captured, an electronic device (e.g., the electronic device 101 of FIG. 1 and/or the electronic device 201 of FIG. 2) may collect metadata of the captured screenshot, and identify an edited screenshot 713 having a scale ratio matching that of the captured screenshot 711, among at least one edit template included in the list of edit templates associated with the metadata of the captured screenshot.

As shown in screen <730>, the electronic device (e.g., the electronic device 101 of FIG. 1 and/or the electronic device 201 of FIG. 2) may identify an edit template including the edited screenshot 713 having a scale ratio matching that of the captured screenshot 711, and when the edit template includes a first effect group, edit the screenshot by applying a drawing effect 731 to an object of the captured screenshot 711 in the same manner of the application of the drawing effect 731 to an object of the edited screenshot 713 and display the edited screenshot.

Figure 8:
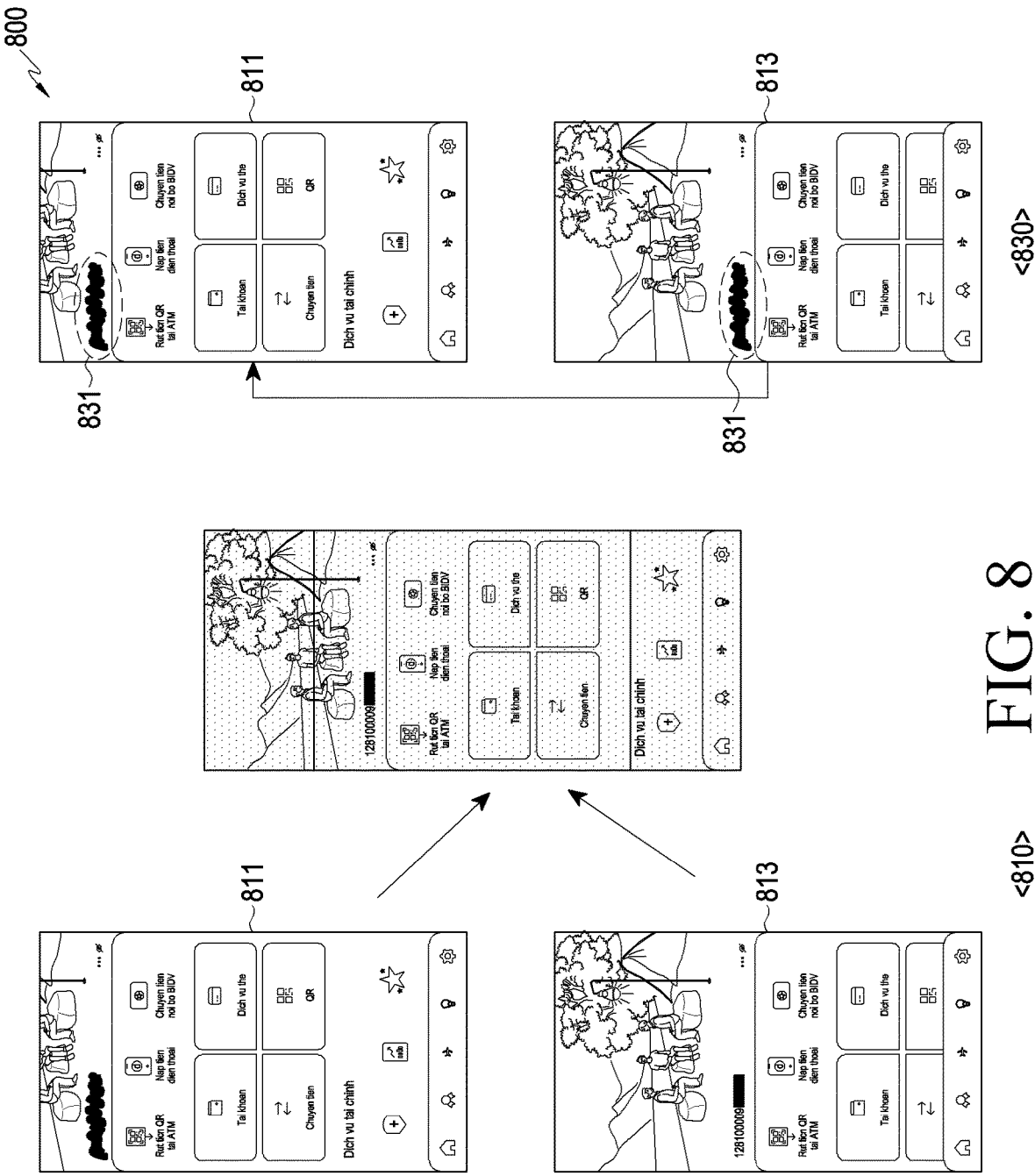
FIG. 8 illustrates an operation of editing a screenshot based on an edit template in an electronic device according to an embodiment of the disclosure.

FIG. 8 is a diagram 800 for explaining an operation of editing a screenshot based on an edit template in an electronic device according to an embodiment of the disclosure.

Referring to FIG. 8, as shown in screen <810>, when a screenshot 811 is captured, an electronic device (e.g., the electronic device 101 of FIG. 1 and/or the electronic device 201 of FIG. 2) may collect metadata of the captured screenshot, and identify an edit template including an edited screenshot 813 having a scale ratio partially matching that of the captured screenshot 811, among at least one edit template included in the list of edit templates associated with the metadata of the captured screenshot.

As shown in screen <830>, the electronic device (e.g., the electronic device 101 of FIG. 1 and/or the electronic device 201 of FIG. 2) may identify an edit template including the edited screenshot 813 having a scale ratio partially matching that of the captured screenshot 811, and when the edit template includes a first effect group, edit the screenshot by applying a drawing effect 831 to an object of the captured screenshot 811 in the same manner of the application of the drawing effect 831 to an object of the edited screenshot 813 and display the edited screenshot.

Figure 9:
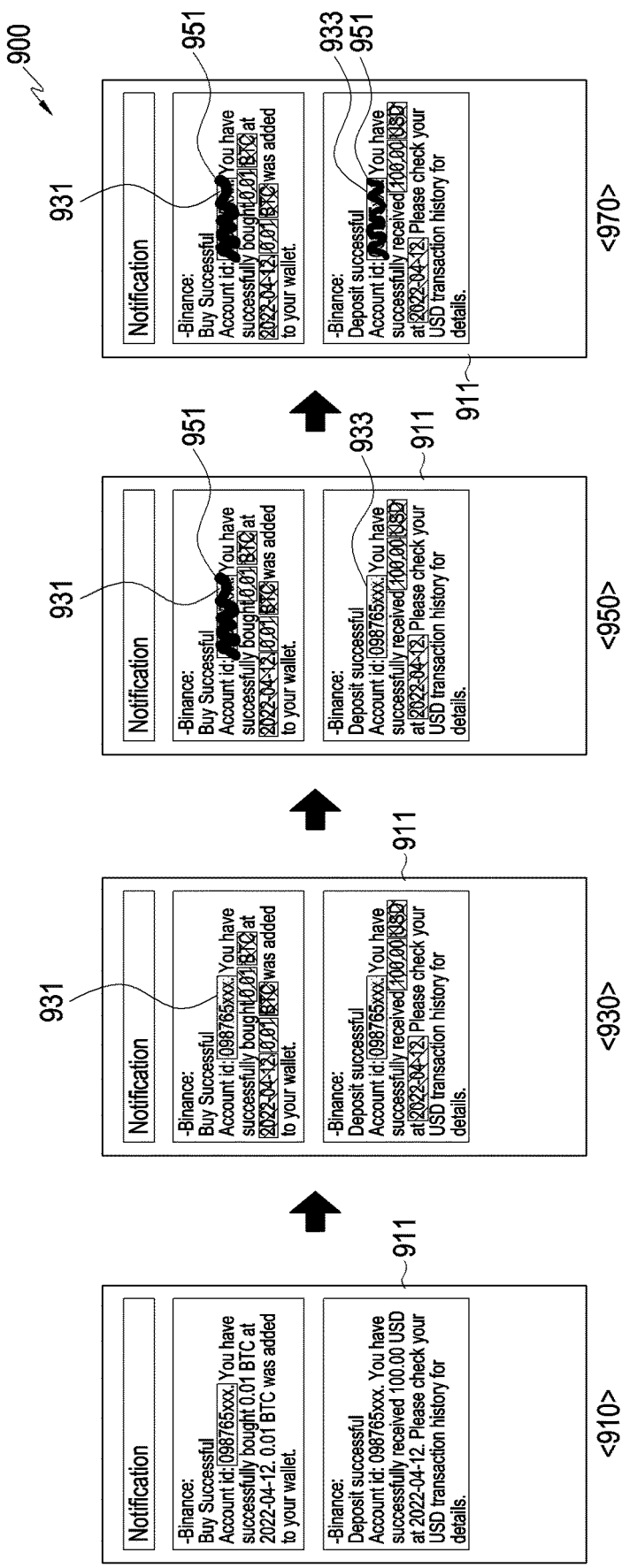
FIG. 9 illustrates an operation of editing a screenshot based on an edit template in an electronic device according to an embodiment of the disclosure.

FIG. 9 is a diagram 900 for explaining an operation of editing a screenshot based on an edit template in an electronic device according to an embodiment of the disclosure.

Referring to FIG. 9, as shown in screen <910>, when a screenshot 911 is captured, an electronic device (e.g., the electronic device 101 of FIG. 1 and/or the electronic device 201 of FIG. 2) may collect metadata of the screenshot, identify an edit template associated with the metadata of the captured screenshot, and identify that an effect group included in the edit template associated with the metadata of the captured screenshot is a first effect group.

As shown in screen <930>, the electronic device (e.g., the electronic device 101 of FIG. 1 and/or the electronic device 201 of FIG. 2) may detect a first object 931 from the captured screenshot 911 based on a result of comparison between the captured screenshot 911 and an edited screenshot included in the edit template, or the object properties of the first effect group.

As shown in screen <950>, when the first object 931 is detected from the screenshot 911, the electronic device (e.g., the electronic device 101 of FIG. 1 and/or the electronic device 201 of FIG. 2) may edit the captured screenshot by applying a drawing effect 951 to the first object 931 based on the effect properties of the first effect group. The electronic device may detect the second object 933 as a result of identifying whether the same type of object as that of the first object 931 exists.

As shown in screen <970>, the electronic device (e.g., the electronic device 101 of FIG. 1 and/or the electronic device 201 of FIG. 2) may apply the same effect properties as that applied to the first object 931 to a second object 933, which is the same type of object as the first object 931, and display the same.

Figure 10:
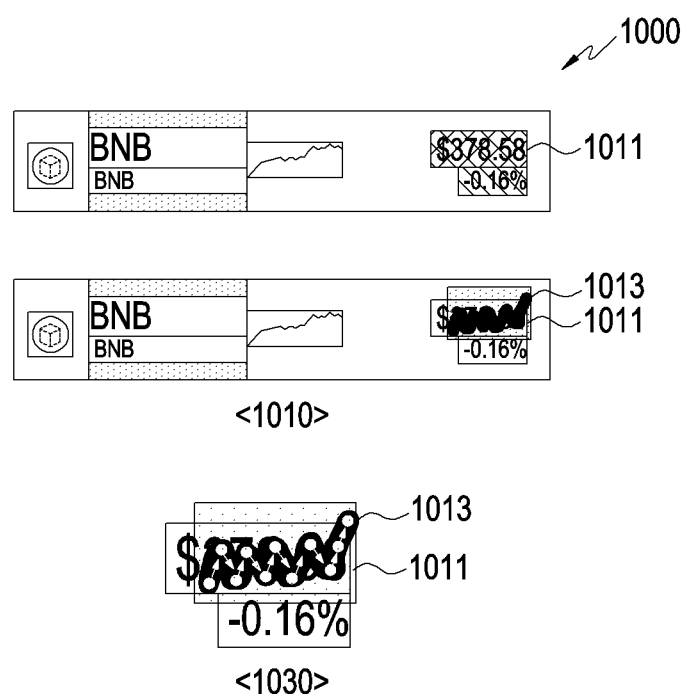
FIG. 10 illustrates an operation of editing a screenshot based on an edit template in an electronic device according to an embodiment of the disclosure.

FIG. 10 is a diagram 1000 for explaining an operation of editing a screenshot based on an edit template in an electronic device according to an embodiment of the disclosure.

Referring to FIG. 10, as shown on screen <1010>, when a screenshot is captured, an electronic device (e.g., the electronic device 101 of FIG. 1 and/or the electronic device 201 of FIG. 2) may collect metadata of the captured screenshot, identify an edit template associated with the metadata of the captured screenshot, identify that an effect group included in the edit template associated with the metadata of the captured screenshot is a first effect group, detect an object 1011 from the captured screenshot, and then apply a drawing effect 1013, which is an effect property of the first effect group, to the object 1011, so as to edit the captured screenshot.

As shown in screen <1030>, the electronic device (e.g., the electronic device 101 of FIG. 1 and/or the electronic device 201 of FIG. 2) may learn a user pattern to apply the drawing effect 1013, which is an effect property of the first effect group, to the object 1011. For example, the electronic device may learn a user pattern, such as drawing, blurring, and/or mosaic, based on a learning machine, such as a generative adversarial network (GAN), an auto encoder, a recurrent neural network (RNN), and/or a mixed density output.

The electronic device may apply the drawing effect 1013 to the object 1011 detected from a new screenshot based on the previously learned user pattern.

FIG. 11 is a diagram 1100 for explaining an operation of detecting an object to edit a screenshot based on an edit template in an electronic device according to an embodiment of the disclosure.

Referring to FIG. 11, an electronic device (e.g., the electronic device 101 of FIG. 1 and/or the electronic device 201 of FIG. 2) may, in a screenshot captured based on an edit template associated with metadata of a screenshot, as shown in screen <1110>, detect an object to which the effect properties of a first effect group of the edit template is applied, based on precision, recall, and/or intersection over union (IoU).

As shown in screen <1130>, at the time of detecting a first object 1131 and a second object 1133 by using the IoU in the screenshot, when it is identified that "IoU (area of the first object, area of editing effect)=46%, IoU (area of the second object, area of editing effect)=8%", the electronic device (e.g., the electronic device 101 of FIG. 1 and/or the electronic device 201 of FIG. 2) may edit the screenshot by applying the drawing effect 1135, which is an effect properties of the first effect group, to the first object 1131.

Figure 12:
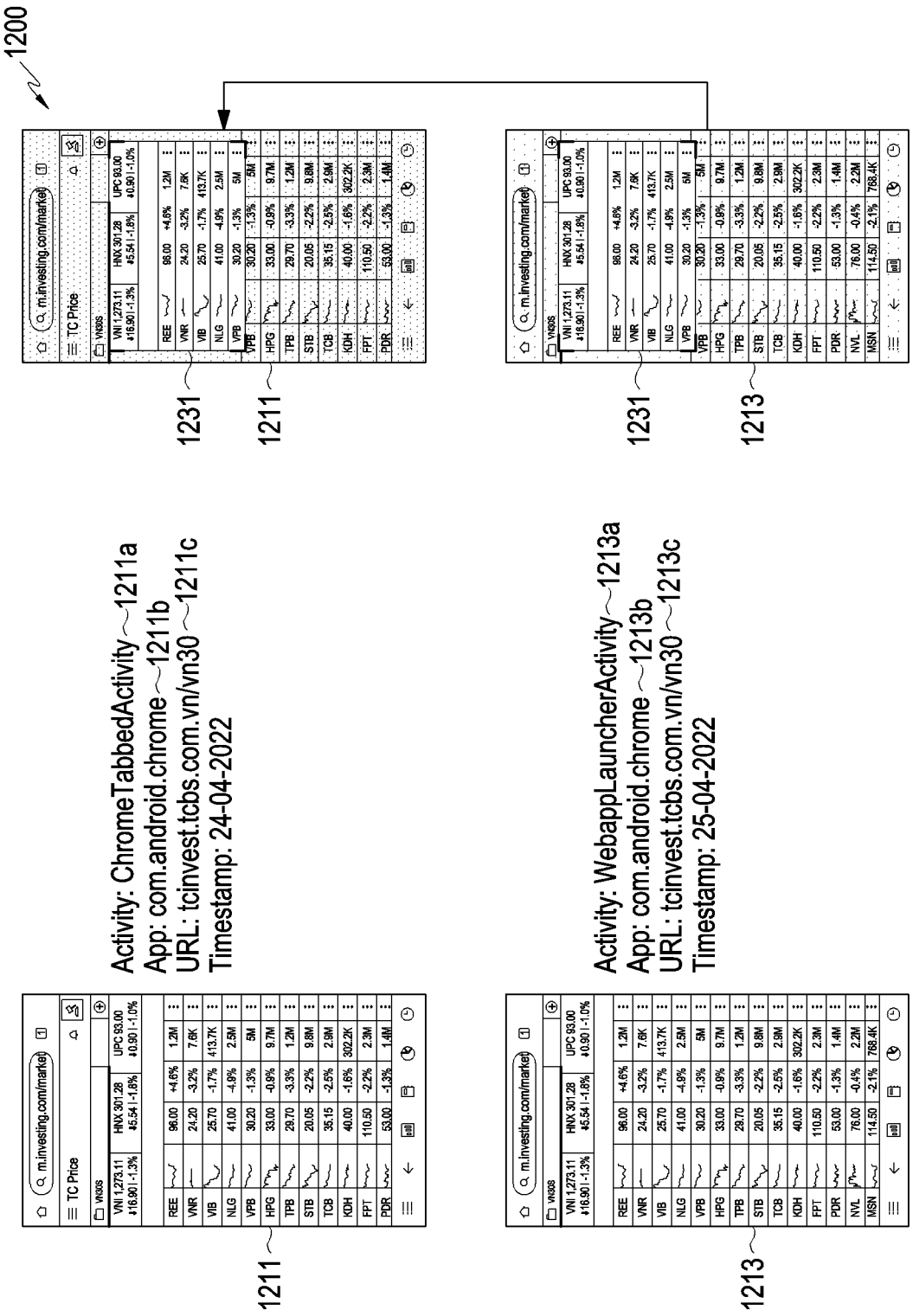
FIG. 12 illustrates an operation of editing a screenshot based on an edit template in an electronic device according to an embodiment of the disclosure.

FIG. 12 is a diagram 1200 for explaining an operation of editing a screenshot based on an edit template in an electronic device according to an embodiment of the disclosure.

Referring to FIG. 12, when a screenshot 1211 is captured as shown in screen <1210>, an electronic device (e.g., the electronic device 101 of FIG. 1 and/or the electronic device 201 of FIG. 2) may collect, as metadata of the captured screenshot, an activity identifier 1211a of an application, an identifier 1211b of the application, and a URL 1211c of a web browser. When the electronic device fails to identify an edit template associated with the metadata of the captured screenshot, the electronic device may identify the existence of a first edit template associated with the metadata of the captured screenshot in a list of edit templates associated with metadata of a different type from the metadata of the screenshot, and use the same. The electronic device may identify, in the list of edit templates associated with metadata of a different type from the metadata of the captured screenshot, a first edit template including an edited screenshot 1213 having an identifier 1213b of the application and a URL 1213c of the web browser, which are the same as those of the metadata of the screenshot 1211, an activity identifier 1213a different from that of the screenshot, and a scale ratio matching that of the screenshot 1211, when compared with the metadata of the captured screenshot.

The electronic device (e.g., the electronic device 101 of FIG. 1 and/or the electronic device 201 of FIG. 2) may, as shown in screen <1230>, edit and display the screenshot by applying a drawing effect 1231 to the object of the screenshot 1211 in the same manner of the application of the drawing effect 1231 to the object of the editing screenshot 1213 of the first edit template.

Figure 13:
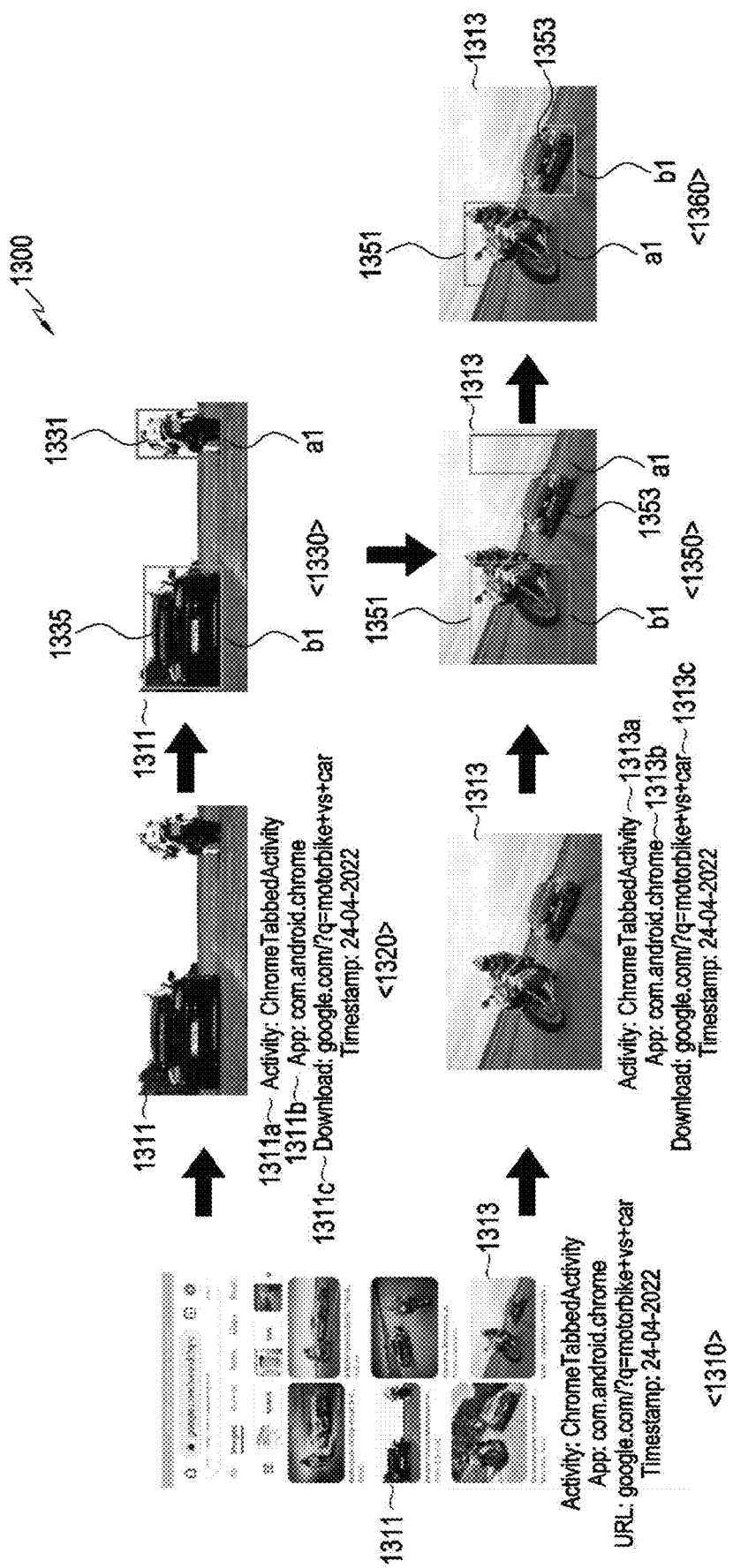
FIG. 13 illustrates an operation of editing a screenshot based on an edit template in an electronic device according to an embodiment of the disclosure.

FIG. 13 is a diagram 1300 for explaining an operation of editing a screenshot based on an edit template in an electronic device according to an embodiment of the disclosure.

Referring to FIG. 13, in a case of downloading a first image 1311 from a specific website as shown in screen <1310>, an electronic device (e.g., the electronic device 101 of FIG. 1 and/or the electronic device 201 of FIG. 2) may collect, as shown in the screen <1320>, an activity identifier 1311a of an application, an identifier 1311b of the application, and a URL 1311c of a web browser, as metadata of the first image. As shown in screen <1330>, when a user performs an edit operation, for the downloaded first image 1311, of labelling a motorcycle 1331 with a box a1 of a first color, labelling a car 1335 with a box b1 of a second color different from the first color, the electronic device may store a new edit template based on the user's editing operation.

In a case of downloading a second image 1313 from a specific website as shown in screen <1310>, the electronic device (e.g., the electronic device 101 of FIG. 1 and/or the electronic device 201 of FIG. 2) may collect, as shown in the screen <1340>, an activity identifier 1313*a* of an application, an identifier 1313*b* of the application, and a URL 1313*c* of a web browser, as metadata of the second image. As shown in the <1350> screen, the electronic device may display the first colored box a1 and the second colored box b1 in the second image 1313 as recommendations, based on an edit template generated by editing the first image having the same metadata as that of the second image 1313. As shown in screen <1360>, the user may move the first colored box a1 to match the motorcycle 1351 and move the second colored box b1 to match the car 1353, thereby reducing the user's edit operation time.

Figure 14A:
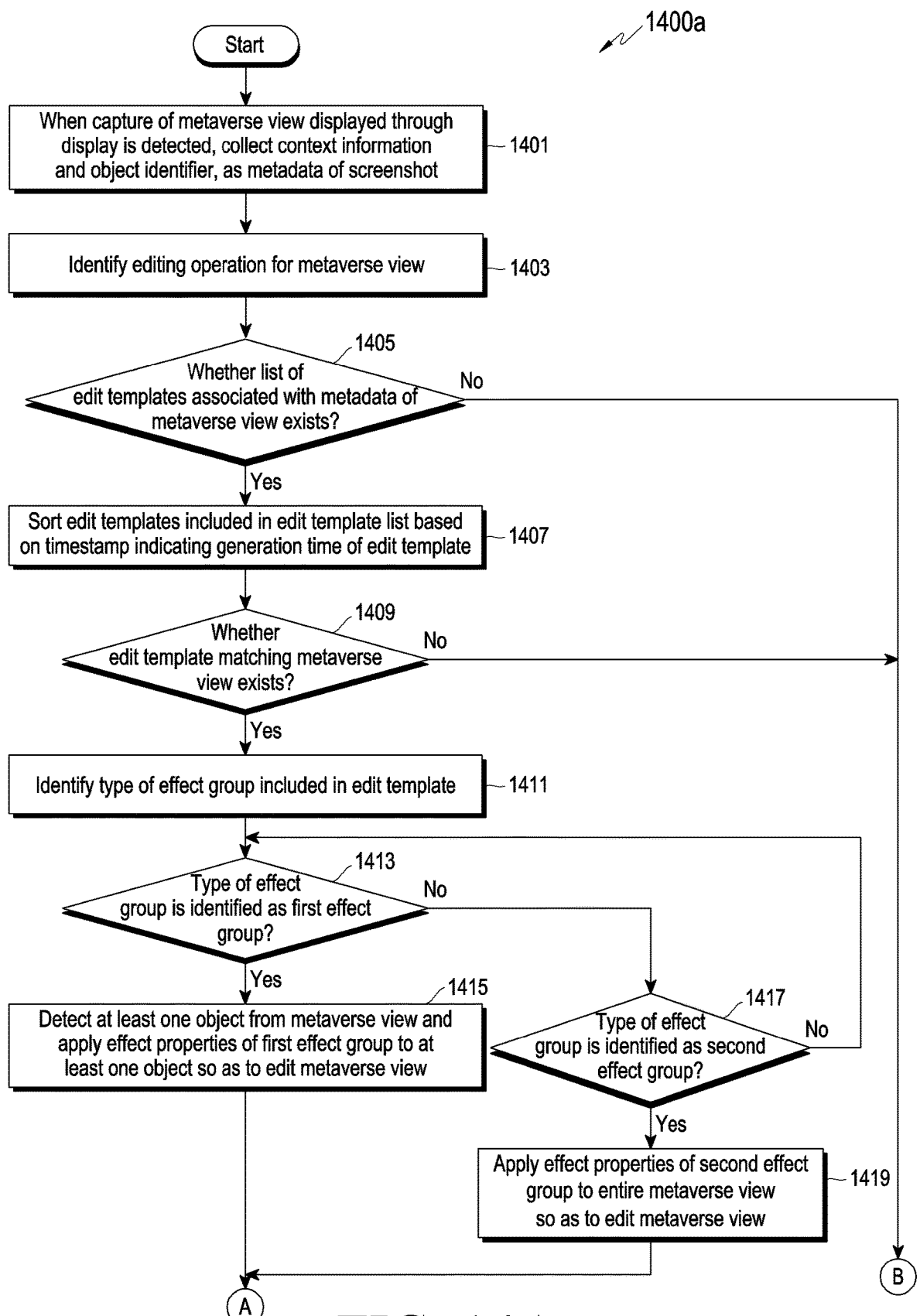
FIG. 14A is a flowchart illustrating an operation of editing a view of a metaverse in an electronic device according to an embodiment of the disclosure.
Figure 14B:
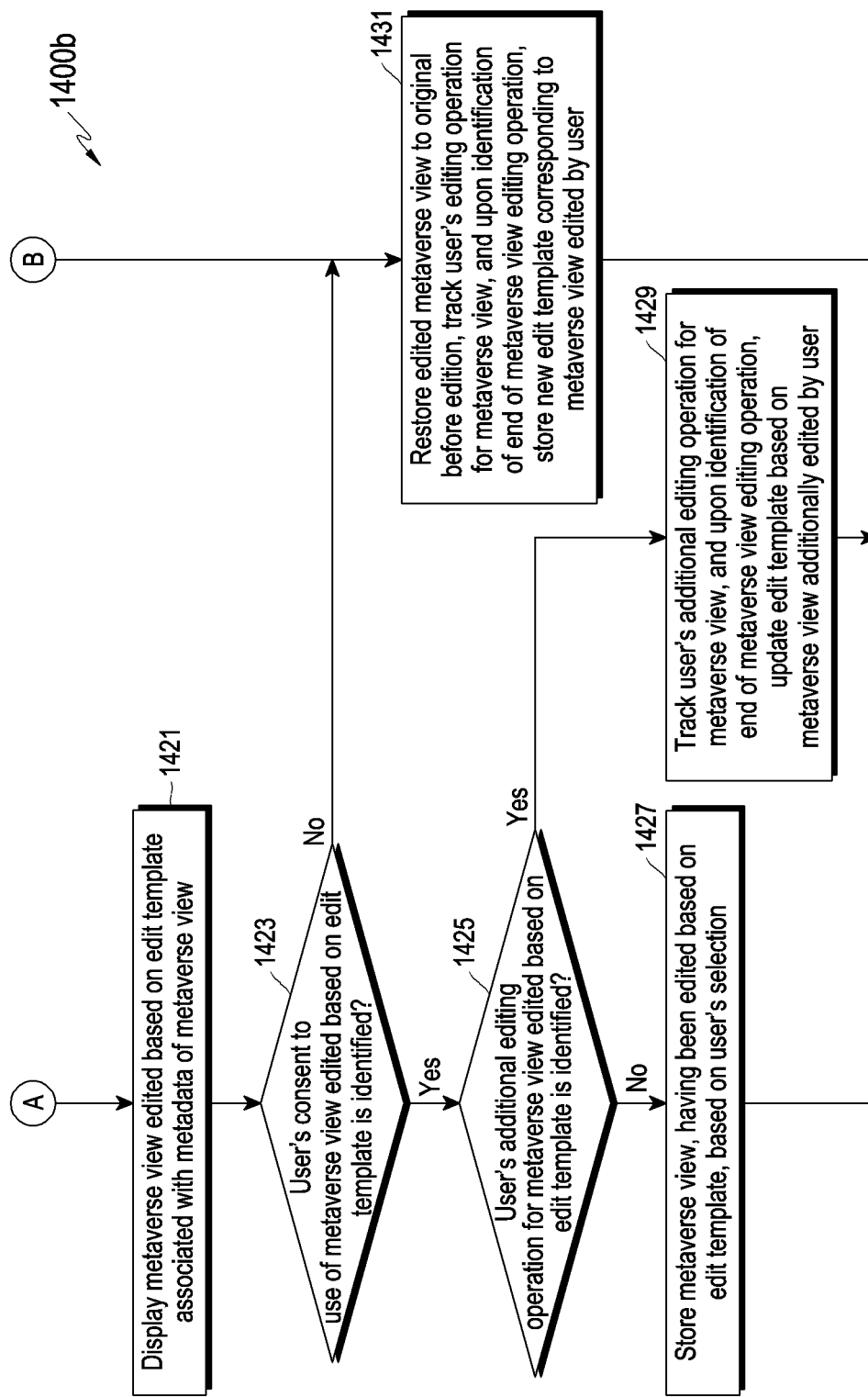
FIG. 14B is a flowchart illustrating an operation of editing a view of a metaverse in an electronic device according to an embodiment of the disclosure.

FIG. 14A is a flowchart 1400*a* illustrating an operation of editing a view of a metaverse in an electronic device according to an embodiment of the disclosure, and FIG. 14B is a flowchart 1400*b* illustrating an operation of editing a view of a metaverse in an electronic device according to an embodiment of the disclosure. The operations of editing a view of a metaverse may include operations 1401 through 1431. In the following embodiments, each operation may be performed sequentially, but is not necessarily performed sequentially. For example, the order of each operation may be changed, at least two operations may be performed in parallel, or another operation may be added.

In operation 1401, an electronic device (e.g., the electronic device 101 of FIG. 1 and/or the electronic device 201 of FIG. 2) may, upon detecting a capture of a metaverse view displayed via a display (e.g., display 260 of FIG. 2), collect context information and an object identifier as metadata.

According to an embodiment, the electronic device may receive the contextual information and the identifier of the object via a server of the metaverse.

In operation 1403, the electronic device (e.g., the electronic device 101 of FIG. 1 and/or the electronic device 201 of FIG. 2) may identify an edit operation on a view of the metaverse.

According to an embodiment, the electronic device may, after the view of the metaverse has been captured, identify an edit operation based on a selection of an editing function.

In operation 1405, the electronic device (e.g., the electronic device 101 of FIG. 1 and/or the electronic device 201 of FIG. 2) may identify the existence of a list of edit templates associated with the metadata of the metaverse view.

According to an embodiment, the electronic device may identify the existence of a list of edit templates associated with the metadata of the metaverse view in an edit template DB (e.g., the edit template DB 235 of FIG. 2) of memory (e.g., the memory 230 of FIG. 2).

According to an embodiment, the edit template DB of the memory may store a list of edit templates associated with the metaverse separately from a list of edit templates associated with a screenshot.

When the electronic device (e.g., the electronic device 101 of FIG. 1 and/or the electronic device 201 of FIG. 2) identifies the existence of the list of edit templates associated with the metadata of the metaverse view in operation 1405, the electronic device may sort the edit templates included in the list of edit templates based on a timestamp indicating a generation time of the edit template in operation 1407.

In operation 1409, the electronic device (e.g., the electronic device 101 of FIG. 1 and/or the electronic device 201 of FIG. 2) may identify the existence of an edit template matching the metaverse view.

According to an embodiment, the electronic device may identify whether or not an edit template including an edited metaverse view that matches the metaverse view exists in the list of edit templates.

When the electronic device (e.g., the electronic device 101 of FIG. 1 and/or the electronic device 201 of FIG. 2) identifies an edit template matching the metaverse view in operation 1409, the electronic device may identify the type of effect group included in the edit template in operation 1411.

When the electronic device (e.g., the electronic device 101 of FIG. 1 and/or the electronic device 201 of FIG. 2) identifies the type of effect group as a first effect group in operation 1413, the electronic device may detect at least one object in the metaverse view, and edit the metaverse view by applying an effect property of the first effect group to the at least one object, in operation 1415.

According to an embodiment, the electronic device may detect the object in the metaverse view based on an object identifier (ID) stored as metadata of the metaverse view.

When the electronic device (e.g., the electronic device 101 of FIG. 1 and/or the electronic device 201 of FIG. 2) identifies the type of effect group as a second effect group in operation 1417, the electronic device may edit the metaverse view by applying an effect property of the second effect group to the entire image in the metaverse view in operation 1419.

In operation 1421, the electronic device (e.g., the electronic device 101 of FIG. 1 and/or the electronic device 201 of FIG. 2) may display the metaverse view edited based on an edit template associated with metadata of the metaverse view.

When the electronic device (e.g., the electronic device 101 of FIG. 1 and/or the electronic device 201 of FIG. 2) identifies a user's consent to use of the metaverse view edited based on the edit template in operation 1423, and fails to identify the user's additional editing operation for the metaverse view edited based on the edit template in operation 1425, the electronic device may store the metaverse view edited based on the edit template, based on the user's selection in operation 1427. The electronic device (e.g., the electronic device 101 of FIG. 1 and/or the electronic device 201 of FIG. 2) identify that the user's consent to use of the metaverse view edited is detected based on an input not to store the edited screenshot in the memory.

When the electronic device (e.g., the electronic device 101 of FIG. 1 and/or the electronic device 201 of FIG. 2) identifies the user's additional editing operation on the metaverse view edited based on the edit template in operation 1425, the electronic device may track the user's additional editing operation for the metaverse view, and upon identification of the end of the editing operation for the metaverse view, update the edit template based on the metaverse view additionally edited by the user, in operation 1429.

According to an embodiment, the electronic device may store the edit template in an edit template DB (e.g., the edit template DB 235 of FIG. 2) of memory (e.g., the memory 230 of FIG. 2) as a new edit template based on the metaverse view additionally edited by the user.

When the electronic device (e.g., the electronic device 101 of FIG. 1 and/or the electronic device 201 of FIG. 2) fails to identify a list of edit templates associated with the metadata of the metaverse view in operation 1405, when the electronic device fails to identify an edit template matching the metaverse view in operation 1409, or when the electronic device fails to identify a user's consent to use of the metaverse view edited based on the edit template in operation 1423, the electronic device may restore the edited metaverse view to the original before editing and display the same, track the user's editing operation for the metaverse view, and upon identification of the end of the editing operation for the metaverse view, store a new edit template corresponding to the metaverse view edited by the user, in operation 1431. The electronic device (e.g., the electronic device 101 of FIG. 1 and/or the electronic device 201 of FIG. 2) identify that the user's consent to use of the metaverse view edited is not detected based on an input not to store the edited screenshot in the memory.

According to an embodiment, the new edit template corresponding to the metaverse view edited by the user may be stored in an edit template DB (e.g., the edit template DB 235 of FIG. 2) of memory (e.g., the memory 230 of FIG. 2).

Figure 15A:
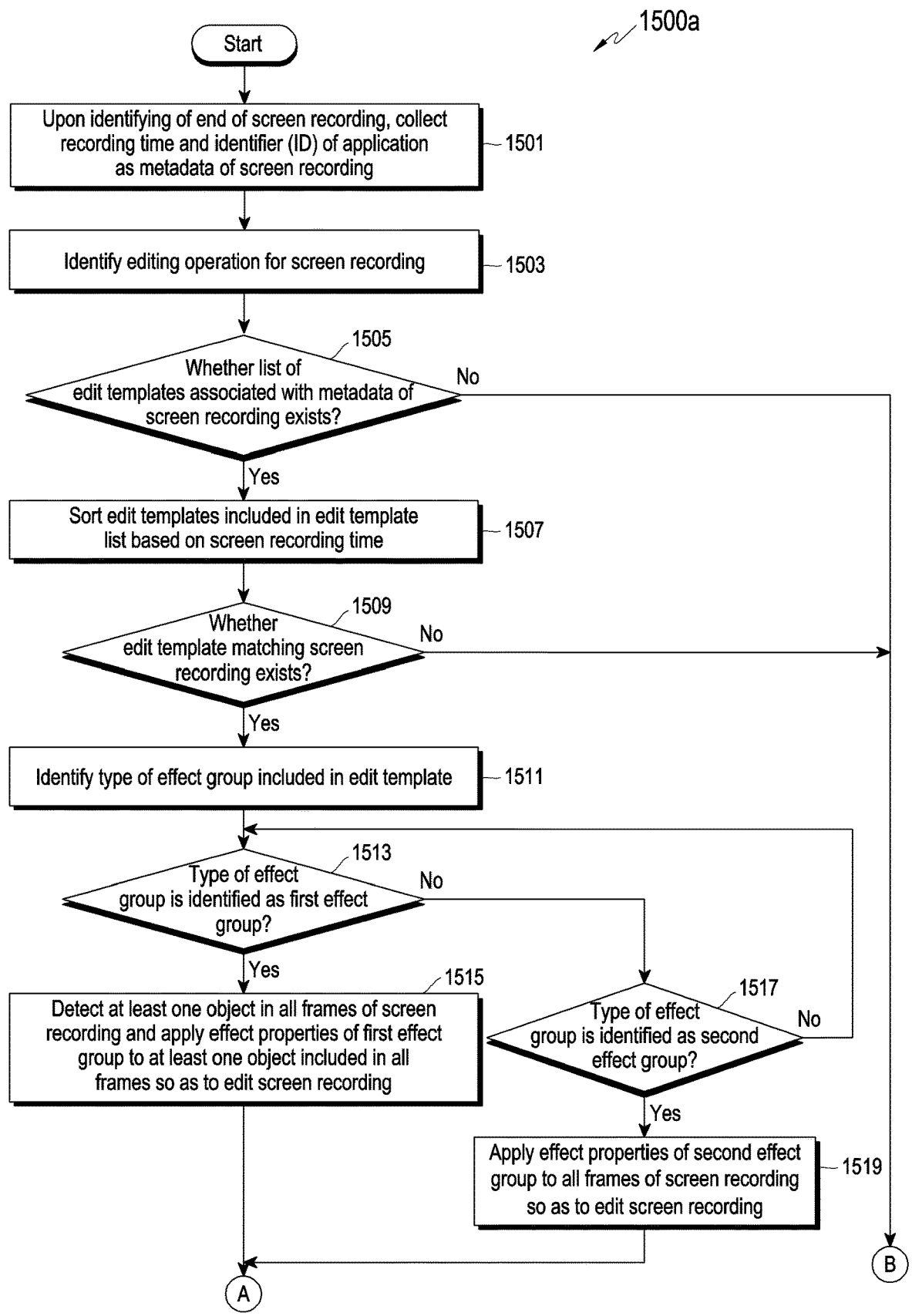
FIG. 15A is a flowchart illustrating an operation of editing a screen recording in an electronic device according to an embodiment of the disclosure.
Figure 15B:
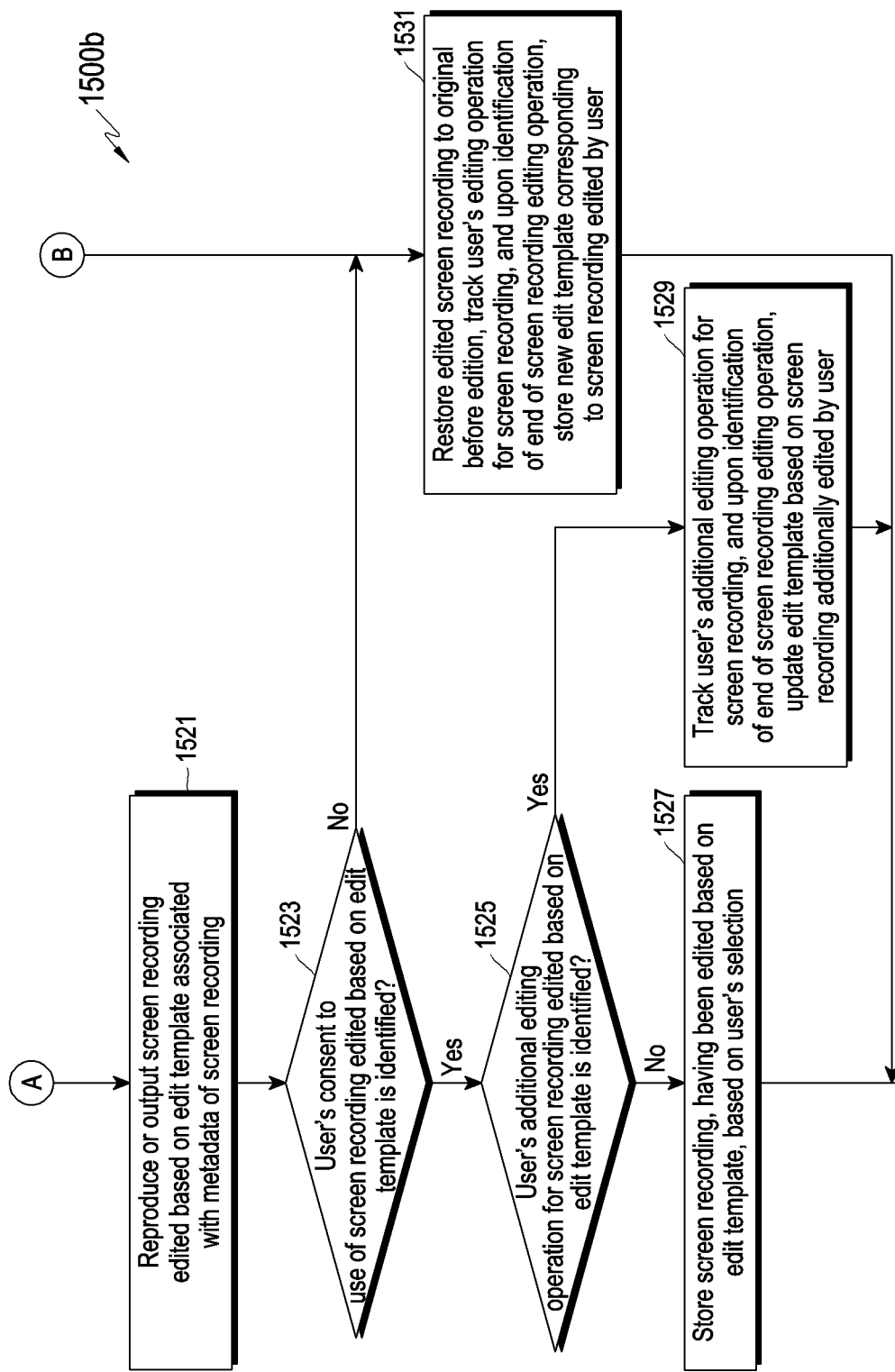
FIG. 15B is a flowchart illustrating an operation of editing a screen recording in an electronic device according to an embodiment of the disclosure.

FIG. 15A is a flowchart 1500a illustrating operations for editing a screen recording in an electronic device according to an embodiment of the disclosure, and FIG. 15B is a flowchart 1500b illustrating operations for editing a screen recording in an electronic device according to an embodiment of the disclosure. The operations of editing a screen recording may include operations 1501 to 1531. In the following embodiment, each operation may be performed sequentially, but is not necessarily performed sequentially. For example, the order of each operation may be changed, at least two operations may be performed in parallel, or another operation may be added.

In operation 1501, an electronic device (e.g., the electronic device 101 of FIG. 1 and/or electronic device 201 of FIG. 2) may, upon identifying of the end of the screen recording, collect a recording time and an identifier (ID) of application as metadata of the screen recording.

In operation 1503, the electronic device (e.g., the electronic device 101 of FIG. 1 and/or the electronic device 201 of FIG. 2) may identify an editing operation for the screen recording.

In operation 1505, the electronic device (e.g., the electronic device 101 of FIG. 1 and/or the electronic device 201 of FIG. 2) may identify whether or not a list of edit templates associated with the screen recording exists.

According to an embodiment, the electronic device may identify the existence of a list of edit templates associated with metadata of the screen recording in an edit template DB (e.g., the edit template DB 235 of FIG. 2) of memory (e.g., the memory 230 of FIG. 2).

According to an embodiment, the edit template DB of the memory may store a list of edit templates associated with a screen recording separately from a list of edit templates associated with a screenshot and a list of edit templates associated with a metaverse.

When the electronic device (e.g., the electronic device 101 of FIG. 1 and/or electronic device 201 of FIG. 2) identifies the existence of the list of edit templates associated with the metadata of the screen recording in operation 1505, the electronic device may sort the edit templates included in the list of edit templates based on a screen recording time in operation 1507.

In operation 1509, the electronic device (e.g., the electronic device 101 of FIG. 1 and/or the electronic device 201 of FIG. 2) may identify whether or not an edit template that matches a screen recording exists.

According to an embodiment, the electronic device may identify whether an edit template including an edit screen recording which recording time and an identifier (ID) of an application match exists in the list of edit templates, based on the metadata of the screen recording.

When the electronic device (e.g., the electronic device 101 of FIG. 1 and/or the electronic device 201 of FIG. 2) identifies the edit template matching the screen recording in operation 1509, the electronic device may identify the type of effect group included in the edit template in operation 1511.

In an embodiment, the electronic device may, in case that an edit template includes a cropping effect, delete a redundant frame among frames included in the screen recording before identifying the type of effect group included in the edit template.

When the electronic device (e.g., the electronic device 101 of FIG. 1 and/or electronic device 201 of FIG. 2) identifies the type of effect group as a first effect group in operation 1513, the electronic device may detect at least one object in all frames of the screen recording and apply an effect property of the first effect group to the at least one object included in all frames, so as to edit the screen recording, in operation 1515.

According to an embodiment, the electronic device may detect the at least one object in all frames of the screen recording using the object recognition function.

When the electronic device (e.g., the electronic device 101 of FIG. 1 and/or the electronic device 201 of FIG. 2) identifies the type of effect group as a second effect group in operation 1517, the electronic device may edit the screen recording by applying effect properties of the second effect group to all frames of the screen recording in operation 1519.

In operation 1521, the electronic device (e.g., the electronic device 101 of FIG. 1 and/or the electronic device 201 of FIG. 2) may reproduce or output the screen recording edited based on an edit template associated with metadata of the screen recording.

When the electronic device (e.g., the electronic device 101 of FIG. 1 and/or the electronic device 201 of FIG. 2) identifies a user's consent to use of the screen recording edited based on the edit template in operation 1523, and fails to identify the user's additional editing operation for the screen recording edited based on the edit template in operation 1525, the electronic device may store the screen recording, which is edited based on the edit template, based on the user's selection in operation 1527.

When the electronic device (e.g., the electronic device 101 of FIG. 1 and/or the electronic device 201 of FIG. 2) identifies the user's additional editing operation for the screen recording edited based on the edit template in operation 1525, the electronic device may track the user's additional editing operation for the screen recording, and upon identification of the end of the editing operation for the screen recording, update the edit template based on the screen recording additionally edited by the user, in operation 1529.

According to an embodiment, the electronic device may store, based on the screen recording additionally edited by the user, the edit template in an edit template DB (e.g., the edit template DB 235 of FIG. 2) of memory (e.g., the memory 230 of FIG. 2) as a new edit template.

In case that the electronic device (e.g., electronic device 101 of FIG. 1 and/or electronic device 201 of FIG. 2) fails to identify a list of edit templates associated with metadata of the screen recording in operation 1505, that the electronic device fails to identify an edit template matching the screen recording in operation 1509, or that the electronic device fails to identify a user's consent to use of the screen recording edited based on the edit template in operation 1523, the electronic device may restore the edited screen recording to the original before editing, track the user's editing operation for the screen recording, and upon identification of the end of the screen recording editing operation, store a new edit template corresponding to the screen recording edited by the user, in operation 1531.

According to an embodiment, the electronic device may store a new edit template corresponding to the screen recording edited by the user, in an edit template DB (e.g., the edit template DB 235 of FIG. 2) of memory (e.g., the memory 230 of FIG. 2).

A method for editing a screenshot in an electronic device according to an embodiment may include, when a first input for capturing a screenshot for information displayed on a display (160 of FIG. 1, 260 of FIG. 2) of the electronic device (101 of FIG. 1, 201 of FIG. 2) is identified, obtaining data related to an application providing the information, as metadata of the screenshot.

The method according to an embodiment may include, when a second input for editing the captured screenshot is identified, identifying whether an edit template associated with the metadata of the screenshot exists in memory (130 of FIG. 1, 230 of FIG. 2) of the electronic device.

The method according to an embodiment may include, when the edit template associated with the metadata of the screenshot exists in the memory, editing the screenshot based on the edit template.

The method according to an embodiment may include controlling the display to display the edited screenshot.

The method according to an embodiment may include obtaining, as the metadata of the screenshot, at least one of an identifier of the application, a name of the application, a package name capable of identifying the application, an activity identifier of the application, a page identifier of a web application, or a URL of a web browser.

The method according to an embodiment may include identifying a list of edit templates associated with the metadata of the captured screenshot in an edit template DB (235 of FIG. 2) of the memory.

The method according to an embodiment may include identifying an edit template including the edited screenshot having a scale ratio matching that of the captured screenshot, in the list of edit templates.

The method according to an embodiment may include identifying a type of effect group included in the edit template.

The method according to an embodiment may include, when the type of the effect group is a first effect group, detecting at least one object from the captured screenshot, and applying an effect property of the first effect group to the detected at least one object to edit the captured screenshot.

The method according to an embodiment may include detecting the location of an object existing in the captured screenshot based on a result of comparison between the edited screenshot and the captured screenshot.

The method according to an embodiment may include, when an object is not detected in the captured screenshot based on the result of comparison between the edited screenshot and the captured screenshot, detecting the location of the object existing in the captured screenshot through an object recognition function.

The method according to an embodiment may include, in case that the type of the effect group is a second effect group, editing the captured screenshot by applying an effect property of the second effect group to the captured screenshot.

The method according to an embodiment may include, when an edit template associated with the metadata of the captured screenshot does not exist in the memory, tracking a user's editing operation for the captured screenshot.

The method according to an embodiment may include, when the user's editing operation ends, storing a new edit template corresponding to the edited screenshot by the user in the edit template DB of the memory.

The method according to an embodiment may include, when a third input for additionally editing the edited screenshot is identified during displaying the edited screenshot on the display, additionally editing the edited screenshot based on the third input.

The method according to an embodiment may include, when identifying that third input ends, updating the edit template based on the additionally edited screenshot.

The method according to an embodiment may include, when a fourth input not to store the edited screenshot in the memory is identified during displaying the edited screenshot on the display, restoring the captured screenshot on the display.

The method according to an embodiment may include, when a fifth input for editing the restored captured screenshot is identified, editing the restored captured screenshot based on the fifth input.

The method according to an embodiment may include tracking a user's editing operation for the screenshot, and when identifying that the fifth input ends, storing a new editing template corresponding to the restored captured screenshot in the edit template DB of the memory.

A non-transitory computer readable medium storing at least one instruction, wherein the at least one instruction, when executed by a processor of an electronic device, causes the electronic device to, according to an embodiment, when a first input for capturing a screenshot for information displayed on the display is identified, obtain data related to an application providing the information, as metadata of the screenshot.

The non-transitory computer readable medium storing at least one instruction, wherein the at least one instruction, when executed by the processor of the electronic device, causes the electronic device to, according to an embodiment, when a second input for editing the captured screenshot is identified, identify whether an edit template associated with the metadata of the screenshot exists in memory of the electronic device.

The non-transitory computer readable medium storing at least one instruction, wherein the at least one instruction, when executed by the processor of the electronic device, causes the electronic device to, according to an embodiment, when the edit template associated with the metadata of the screenshot exists in the memory, edit the screenshot based on the edit template.

The non-transitory computer readable medium storing at least one instruction, wherein the at least one instruction, when executed by the processor of the electronic device, causes the electronic device to, according to an embodiment, control the display to display the edited screenshot.

The electronic device according to embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that embodiments of the disclosure and the terms used therein are not intended to limit the technological features set forth herein to particular embodiments and include various changes, equivalents, or replacements for a corresponding embodiment. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used in connection with embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Embodiments as set forth herein may be implemented as software (e.g., the program 140) including one or more instructions that are stored in a storage medium (e.g., internal memory 136 or external memory 138) that is readable by a machine (e.g., the electronic device 101 or the electronic device 201). For example, a processor (e.g., the processor 520) of the machine (e.g., the electronic device 201) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to embodiments, each component (e.g., a module or a program) of the above-described components may include a single entity or multiple entities, and some of the multiple entities may be separately disposed in different components. According to embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to embodiments, operations performed by the module, the program, or another component may be carried out sequentially, in parallel, repeatedly, or heuristically, or one or more of the operations may be executed in a different order or omitted, or one or more other operations may be added.

According to an embodiment of the disclosure, provided may be a non-transitory computer-readable recording medium storing instructions which, when executed by an electronic device, cause the electronic device to perform at least one operation, the at least one operation including, in case that a screenshot capture for information displayed on a display of the electronic device is detected, collecting data related to an application providing the information, as metadata of the screenshot, in case that an editing operation for the captured screenshot is identified, identifying whether an edit template associated with the metadata of the screenshot exists in memory of the electronic device, in case that the edit template associated with the metadata of the screenshot exists in the memory, editing the screenshot based on the edit template, and controlling the display so as to display the edited screenshot.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic device comprising:
   memory;
   a display; and
   a processor,
   wherein the memory stores at least one instruction configured to cause, when executed by the processor, the electronic device to:
   when a first input for capturing a screenshot for information displayed on the display is identified, obtain data related to an application providing the information, as metadata of the captured screenshot,
   when a second input for editing the captured screenshot is identified, identify whether an edit template associated with the metadata of the captured screenshot exists in the memory,
   when the edit template associated with the metadata of the captured screenshot exists in the memory, identify a list of edit templates associated with the metadata of the captured screenshot in an edit template database (DB) of the memory, identify the edit template including the edited screenshot having a scale ratio matching that of the captured screenshot in the list of edit templates, and edit the captured screenshot based on the edit template, and
   control the display to display the edited screenshot.

2. The electronic device of claim 1, wherein the memory stores at least one instruction configured to cause, when executed by the processor, the electronic device to:
obtain, as the metadata of the captured screenshot, at least one of an identifier of the application, a name of the application, a package name capable of identifying the application, an activity identifier of the application, a page identifier of a web application, or a URL of a web browser.

3. The electronic device of claim 1, wherein the memory stores at least one instruction configured to cause, when executed by the processor, the electronic device to:
identify a type of effect group included in the edit template, and
when the type of the effect group is a first effect group, detect at least one object from the captured screenshot, and apply an effect property of the first effect group to the detected at least one object to edit the captured screenshot.

4. The electronic device of claim 1, wherein the memory stores at least one instruction configured to cause, when executed by the processor, the electronic device to:
detect a location of an object existing in the captured screenshot based on a result of comparison between the edited screenshot and the captured screenshot.

5. The electronic device of claim 4, wherein the memory stores at least one instruction configured to cause, when executed by the processor, the electronic device to:
when an object is not detected from the captured screenshot based on the result of comparison between the edited screenshot and the captured screenshot, detect a location of the object existing in the captured screenshot through an object recognition function.

6. The electronic device of claim 1, wherein the memory stores at least one instruction configured to cause, when executed by the processor, the electronic device to:
when the type of the effect group is a second effect group, edit the captured screenshot by applying an effect property of the second effect group to the captured screenshot.

7. The electronic device of claim 1, wherein the memory stores at least one instruction configured to cause, when executed by the processor, the electronic device to:
when an edit template associated with the metadata of the captured screenshot does not exist in the memory, track a user's editing operation for the captured screenshot, and
when the user's editing operation ends, store a new edit template corresponding to the edited screenshot in the edit template DB of the memory.

8. The electronic device of claim 1, wherein the memory stores at least one instruction configured to cause, when executed by the processor, the electronic device to:
when a third input for additionally editing the edited screenshot is identified during displaying the edited screenshot on the display, additionally edit the edited screenshot based on the third input, and
when identifying that the third input ends, update the edit template based on the additionally edited screenshot.

9. The electronic device of claim 1, wherein the memory stores at least one instruction configured to cause, when executed by the processor, the electronic device to:
when a fourth input not to store the edited screenshot in the memory is identified during displaying the edited screenshot on the display, restore the captured screenshot on the display,
when a fifth input for editing the restored captured screenshot is identified, edit the restored captured screenshot based on the fifth input, and
when identifying that the fifth input ends, store a new editing template corresponding to the restored captured screenshot in the edit template DB of the memory.

10. A method for editing a screenshot in an electronic device, the method comprising:
when a first input for capturing a screenshot for information displayed on a display of the electronic device is identified, obtaining data related to an application providing the information, as metadata of the captured screenshot;
when a second input for editing the captured screenshot is identified, identifying whether an edit template associated with the metadata of the captured screenshot exists in memory of the electronic device;
when the edit template associated with the metadata of the captured screenshot exists in the memory, identifying a list of edit templates associated with the metadata of the captured screenshot in an edit template database (DB) of the memory, identifying the edit template including the edited screenshot having a scale ratio matching that of the captured screenshot, in the list of edit templates and editing the captured screenshot based on the edit template; and
controlling the display to display the edited screenshot.

11. The method of claim 10, further comprising:
obtaining, as the metadata of the captured screenshot, at least one of an identifier of the application, a name of the application, a package name capable of identifying the application, an activity identifier of the application, a page identifier of a web application, or a URL of a web browser.

12. The method of claim 10, further comprising:
identifying a type of effect group included in the edit template; and
when the type of the effect group is a first effect group, detecting at least one object from the captured screenshot, and applying an effect property of the first effect group to the detected at least one object to edit the captured screenshot.

13. The method of claim 10, further comprising:
detecting a location of an object existing in the captured screenshot based on a result of comparison between the edited screenshot and the captured screenshot.

14. The method of claim 13, further comprising:
when an object is not detected from the captured screenshot based on the result of comparison between the edited screenshot and the captured screenshot, detecting a location of the object existing in the captured screenshot through an object recognition function.

15. The method of claim 10, further comprising:
when the type of the effect group is a second effect group, editing the captured screenshot by applying an effect property of the second effect group to the captured screenshot.

16. The method of claim 10, further comprising:
when an edit template associated with the metadata of the captured screenshot does not exist in the memory, tracking a user's editing operation for the captured screenshot; and
when the user's editing operation ends, storing a new edit template corresponding to the edited screenshot in the edit template DB of the memory.

17. The method of claim 10, further comprising:
when a third input for additionally editing the edited screenshot is identified during displaying the edited screenshot on the display, additionally editing the edited screenshot based on the third input; and
when identifying that the third input ends, updating the edit template based on the additionally edited screenshot.

18. A non-transitory computer readable medium storing at least one instruction, wherein the at least one instruction, when executed by a processor of an electronic device, causes the electronic device to:
when a first input for capturing a screenshot for information displayed on the display is identified, obtain data related to an application providing the information, as metadata of the captured screenshot,
when a second input for editing the captured screenshot is identified, identify whether an edit template associated with the metadata of the captured screenshot exists in memory of the electronic device,
when the edit template associated with the metadata of the captured screenshot exists in the memory, identify a list of edit templates associated with the metadata of the captured screenshot in an edit template database (DB) of the memory, identify the edit template including the edited screenshot having a scale ratio matching that of the captured screenshot in the list of edit templates, and edit the captured screenshot based on the edit template, and
control the display to display the edited screenshot.

* * * * *